(12) United States Patent
Kashiwase

(10) Patent No.: US 6,561,934 B2
(45) Date of Patent: May 13, 2003

(54) OIL PRESSURE CONTROL FOR CONTINUOUSLY VARIABLE TRANSMISSION

(75) Inventor: Hajime Kashiwase, Tokyo-To (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 10 days.

(21) Appl. No.: 09/780,182

(22) Filed: Feb. 9, 2001

(65) Prior Publication Data

US 2001/0016528 A1 Aug. 23, 2001

(30) Foreign Application Priority Data

Feb. 18, 2000 (JP) ............................. 2000-041850
Feb. 18, 2000 (JP) ............................. 2000-041851
Mar. 6, 2000 (JP) ............................. 2000-059731

(51) Int. Cl.$^7$ .................................................. F16H 59/00
(52) U.S. Cl. .............................................. 474/28; 474/18
(58) Field of Search ........................... 474/18, 28, 70; 477/38, 45, 39, 61, 48, 43, 49

(56) References Cited

U.S. PATENT DOCUMENTS

| 4,551,119 A | * | 11/1985 | Sugaya et al. ............... 474/18 |
| 4,669,336 A | * | 6/1987 | Okada et al. ................ 477/48 |
| 4,672,864 A | * | 6/1987 | Morimoto .................... 474/28 |
| 4,846,765 A | * | 7/1989 | Sakai ......................... 474/28 |
| 5,273,492 A | * | 12/1993 | Kashiwase et al. ........... 474/28 |
| 6,336,880 B1 | * | 1/2002 | Agner .......................... 474/18 |

FOREIGN PATENT DOCUMENTS

| JP | 63-152755 | * | 6/1988 | ............. 474/70 |

* cited by examiner

Primary Examiner—Marcus Charles
(74) Attorney, Agent, or Firm—Martin A. Farber

(57) ABSTRACT

A CVT-oil-pressure control apparatus has a primary cylinder provided for a primary pulley, having an oil chamber for applying an oil pressure to the primary pulley and a balance oil chamber for applying a centrifugal oil pressure to the primary pulley in a direction which is reverse of a centrifugal oil pressure generated in the oil chamber; a primary valve for adjusting a primary pressure to be applied to the oil chamber based on a line pressure applied by an oil pump; and a balance oil line that connects a drain port of the primary valve and the balance oil chamber. The oil is supplied from the primary valve to the balance oil chamber through the balance oil line. The apparatus also has a secondary cylinder provided for a secondary pulley, having a secondary chamber for applying an oil pressure to the secondary pulley and a secondary balance oil chamber for applying a centrifugal oil pressure to the secondary pulley in a direction which is reverse of a centrifugal oil pressure generated in the secondary oil chamber; a balance oil line that connects a cooling line and the balance oil chamber. An oil cooler is provided in midstream of the cooling line. Oil passing through the oil cooler is supplied to the primary and the secondary balance chambers through the balance oil line.

12 Claims, 19 Drawing Sheets

OIL PRESSURE CONTROL FOR CONTINUOUSLY VARIABLE TRANSMISSION

BACKGROUND OF THE INVENTION

The present invention relates to an oil pressure controlling apparatus for continuously variable transmission (CVT).

As illustrate in FIGS. 1A and 1B, a CVT 500 is mainly provided with a primary shaft 520 and a secondary shaft 530 arranged in parallel, a primary pulley 550 and a secondary pulley 570 attached to the shafts 520 and 530, respectively, and a drive belt 590 passed over the pulleys 550 and 570.

The CVT 500 continuously varies the speed ratio of driving and driven elements over working range by varying an effective winding ratio of the drive belt 590 to the pulleys 550 and 570.

The primary pulley 550 has a fixed pulley 550a that is driven via a torque converter and a forward/backward-switching mechanism, etc., and a slidable pulley 550b. The slidable pulley 550b is attached to the shaft of the fixed pulley 550a via ball splines 550c for varying a pulley-groove width so that the slidable pulley 550b is slidable in the direction of the shaft and rotates with the fixed pulley in a uniform motion with respect to each other. A transmission oil-pressure cylinder 560 consists of a cylinder 560a fixed at the back of the slidable pulley 550b and a plunger 560b attached to the shaft of the fixed pulley 550a.

Likewise, the secondary pulley 570 has a fixed pulley 570a connected to drive wheels via a reduction mechanism, etc. A slidable pulley 570b is attached to the shaft of the fixed pulley 570a via ball splines 570c so that the slidable pulley 570b is slidable in the direction of the shaft and rotates with the fixed pulley in a uniform motion with respect to each other. A transmission oil-pressure cylinder 580 consists of a cylinder 580a fixed to the back of the slidable pulley 570b and a plunger 580b attached to the shaft of the fixed pulley 570a.

Oil pressure applied by an oil pump to the oil pressure cylinders 560 and 580 provided at the primary pulley 550 and the secondary pulley 570, respectively, are controlled for power transfer and transmission control between the drive belt 590 and the primary and the secondary pulleys 550 and 570.

The primary and the secondary pulleys 550 and 570 are rotating at a predetermined rotational ratio while the CVT 500 is operating. The rotation of pulleys causes generation of centrifugal oil pressure to the oil pressure cylinders 560 and 580.

The centrifugal oil pressure generated to the oil pressure cylinder 560 provided in the primary pulley 550 is applied thereto in a up-shift direction to force the pulley-groove width to be narrow, or to overdrive (OD) in transmission.

Contrary to this, the centrifugal oil pressure generated to the oil pressure cylinder 580 provided in the secondary pulley 570 is applied thereto in a shift-down direction to force the pulley-groove width to be narrow, or to LOW in transmission.

A balance oil chamber 610 is formed on the back of the plunger 560b as a part of the oil pressure cylinder 560 for the primary pulley 550. The balance oil chamber 610 is filled with oil to generate centrifugal oil pressure that cancels force applied in the OD direction due to generation of centrifugal oil pressure in the oil pressure cylinder 560.

Moreover, a balance oil chamber 620 is formed on the back of the plunger 580b by means of a balance oil chamber cylinder 580d, one end of which is connected to a tip of a cylinder portion 580a that is a part of the oil pressure cylinder 580 and the other end is set as slidable along the shaft of a fixed pulley 570a. The balance oil chamber 620 is filled with oil to generate centrifugal oil pressure that cancels force applied in the LOW direction due to generation of centrifugal oil pressure in the oil pressure cylinder 580.

A lubricant is always supplied by an oil pump (not shown) into the balance oil chamber 620 formed in the secondary pulley 570. Shift-down from OD to LOW in transmission speed of the CVT 500 displaces the slidable pulley 570b to left in FIG. 1B (in the direction of the fixed pulley 750a) due to oil pressure applied to the oil cylinder 580 of the secondary pulley 570. This results in contraction of the volume of the balance oil chamber 620 so that the lubricant in the chamber 620 is extruded through a gap 630 formed between the shaft of the fixed pulley 570a and the end of the balance oil cylinder 58d.

Oil pressure used for control and lubrication in the CVT 500 is obtained by the oil pump driven by an engine (not shown). Change in transmission speed by varying the groove-width of the primary and the secondary pulleys 550 and 570 requires enough oil in the oil pump to follow change in volume of the oil cylinders 560 and 580 for prevention of a slip of the drive belt 590 which would otherwise happen due to decrease in clamping power of the belt 590. The oil amount in the oil pump is set for attaining oil flow required for lubrication to forward/backward-switching, etc.

As discussed, energy for driving the oil pump is increased for supplying enough oil to cover energy loss caused by sliding resistance generated in each component. Such energy for the oil pump is also increased to supply oil to components at a pulley-transmission control pressure even though the components operate at a pressure lower than the pulley-transmission control pressure.

The CVT 500 smoothly performs transmission speed control by restricting unnecessary force which would otherwise be generated due to generation of centrifugal oil pressure in the oil pressure cylinders 560 and 580, with the structure in that the balance oil chamber 610 is formed on the back of the plunger 560b as a part of the oil pressure cylinder 560 of the primary pulley 550 and the balance oil chamber 620 is formed on the back of the plunger 580b as a part of the balance oil chamber cylinder 580d of the secondary pulley 570.

The balance oil chamber 620 formed in the secondary pulley 570 is, however, always filled with the lubricant supplied by the oil pump, which causes increase in amount of the lubricant required for CVT operation, thus the oil pump becoming bulk to increase mechanical loss and fuel consumption.

SUMMARY OF THE INVENTION

A purpose of the present invention is to provide an oil pressure control apparatus for CVTs, that decreases consumption of a lubricant supplied by a oil pump.

Another purpose of the present invention is to provide an oil pressure control apparatus for CVTs, that decreases consumption of a lubricant for compactness of an oil pump with decrease in mechanical loss and fuel consumption.

The present invention provides an oil-pressure control apparatus for a continuously variable transmission having a primary pulley and a secondary pulley, a belt being passed around the primary and the secondary pulleys, the apparatus including: a primary cylinder provided for the primary pulley, having an oil chamber for applying an oil pressure to the primary pulley and a balance oil chamber for applying a centrifugal oil pressure to the primary pulley in a direction which is reverse of a centrifugal oil pressure generated in the oil chamber; a primary valve for adjusting a primary pressure to be applied to the oil chamber based on a line pressure applied by an oil pump; and a balance oil line that connects a drain port of the primary valve and the balance oil chamber, oil being supplied from the primary valve to the balance oil chamber through the balance oil line.

Moreover, the present invention provides an oil-pressure control apparatus for a continuously variable transmission having a primary pulley and a secondary pulley, a belt being passed around the primary and the secondary pulleys, the apparatus including: a primary cylinder provided for the primary pulley, having a primary chamber for applying an oil pressure to the primary pulley and a primary balance oil chamber for applying a centrifugal oil pressure to the primary pulley in a direction which is reverse of a centrifugal oil pressure generated in the primary chamber; a secondary cylinder provided for the secondary pulley, having a secondary chamber for applying an oil pressure to the secondary pulley and a secondary balance oil chamber for applying a centrifugal oil pressure to the secondary pulley in a direction which is reverse of a centrifugal oil pressure generated in the secondary oil chamber; a balance oil line that connects a cooling line and the balance oil chamber, an oil cooler being provided in midstream of the cooling line, oil passing through the oil cooler being supplied to the primary and the secondary balance chambers through the balance oil line.

Furthermore, the present invention provides an oil-pressure control apparatus for a continuously variable transmission having a primary pulley and a secondary pulley, a belt being passed around the primary and the secondary pulleys, the apparatus including: a fixed pulley fixed at a secondary shaft of the secondary pulley; a slidable pulley attached to a shaft of the fixed pulley, the slidable pulley being slidable in a direction of the shaft of the fixed pulley and rotating with the fixed pulley in a uniform motion with respect to each other; a transmission oil-pressure cylinder having a cylinder fixed at the back of the slidable pulley and a plunger fixed at the shaft of the fixed pulley; a balance oil chamber formed by the cylinder, the plunger and a balance oil chamber cylinder, one end of the balance oil chamber cylinder being connected to the cylinder, the other end of the balance oil chamber cylinder being slidably connected to the shaft of the fixed pulley via a gap, the balance oil chamber canceling a centrifugal oil pressure generated due to rotation of the pulleys; and a balance oil-pressure control valve for supplying a lubricant to the balance oil chamber, the balance oil-pressure control valve being closed while the lubricant supplied to the balance oil chamber is being drained therefrom.

Moreover, the present invention provides an oil-pressure control apparatus for a continuously variable transmission having a primary pulley and a secondary pulley, a belt being passed around the primary and the secondary pulleys, the apparatus including: a fixed pulley fixed at a secondary shaft of the secondary pulley; a slidable pulley attached to a shaft of the fixed pulley, the slidable pulley being slidable in a direction of the shaft of the fixed pulley and rotating with the fixed pulley in a uniform motion with respect to each other; a transmission oil-pressure cylinder having a cylinder fixed at the back of the slidable pulley and a plunger fixed at the shaft of the fixed pulley; a balance oil chamber formed by the cylinder, the plunger and a balance oil chamber cylinder, one end of the balance oil chamber cylinder being connected to the cylinder, the other end of the balance oil chamber cylinder being slidably connected to the shaft of the fixed pulley via a seal, the balance oil chamber canceling a centrifugal oil pressure generated due to rotation of the pulleys; and a balance oil-pressure control valve for supplying a lubricant to the balance oil chamber through a lubricant-pressure line, the lubricant being drained from the lubricant-pressure line and the balance oil-pressure control valve being closed to stop supply of the lubricant to the balance oil chamber when an oil pressure on the lubricant-pressure line is a predetermined pressure or higher.

DETAILED DESCRIPTION OF PREFERRED EMBODIMENTS

Preferred embodiments according to the present invention will be disclosed with reference to the attached drawings.

An concept of the present invention is as follows:

A enough oil pressure is required for attaining a belt clamping power for prevention of a slip of a drive belt, which is discussed for the well-known CVT.

The present invention is based on the assumption in that decrease in oil amount required for a lubrication pressure promotes decrease in oil pressure loss in a CVT-oil pressure control apparatus and also decrease in energy for driving an oil pump, without respect to line pressure.

Pulley-driven transmission control requires lubricant at line pressure, which, however, do not require a switching operation at oil line through which oil is supplied to a clutch and a brake, thus requiring very little amount of lubricant, hence the total amount of lubricant can be decreased.

Figure 2:
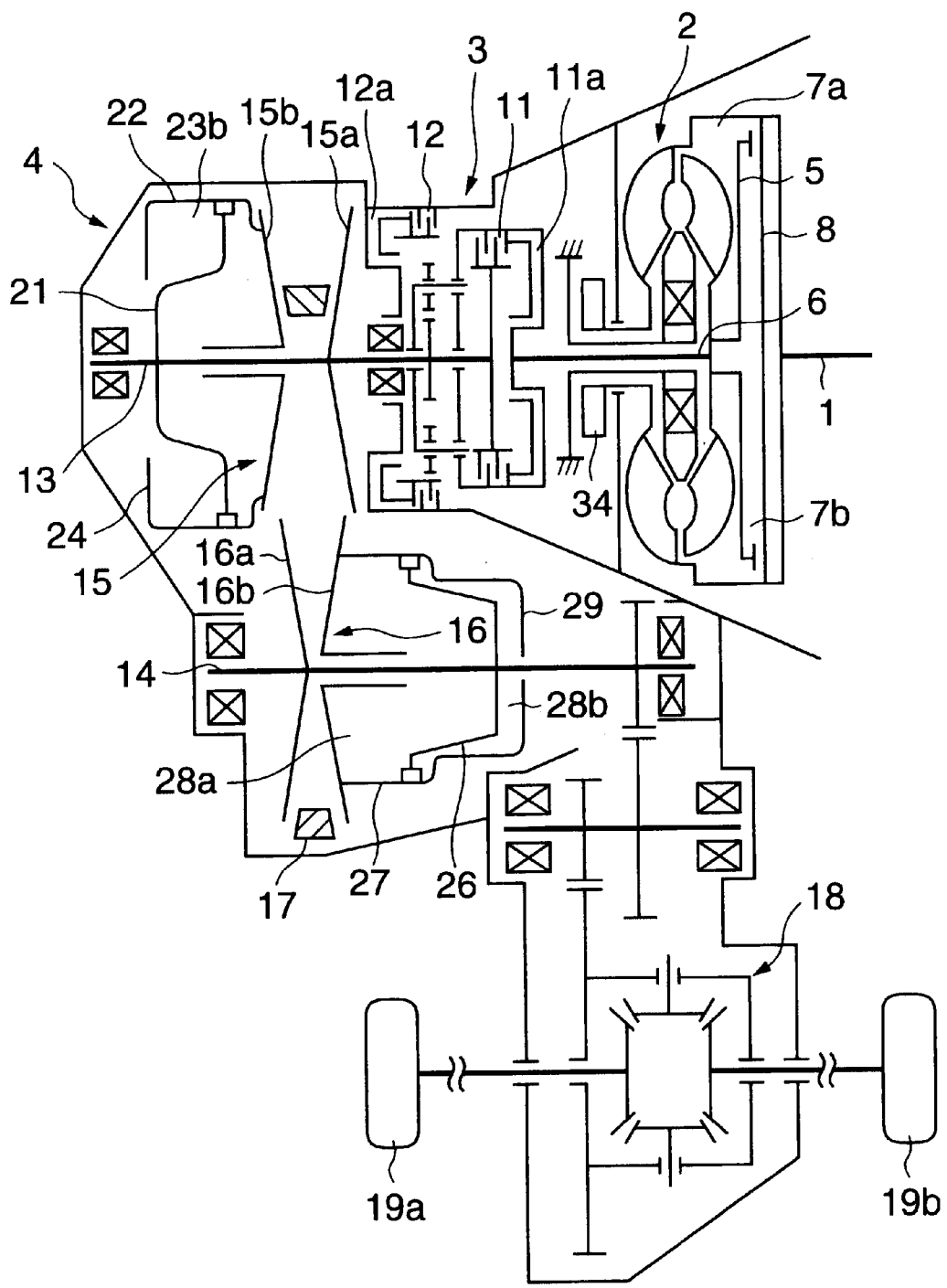
FIG. 2 is a schematic illustration of a CVT driving mechanism.

FIG. 2 is a schematic illustration of a CVT driving mechanism.

Rotation of a clank shaft 1 driven by an engine (not shown) is transferred to a CVT 4 via torque converter 2 as a stater and a forward/backward-switching mechanism 3.

The torque converter 2 has a lock-up clutch 5 connected to a turbine shaft 6. One side of the lock-up clutch 5 is an apply chamber 7a and the other side is a release chamber 7b. Oil supplied to the release chamber 7b is circulated by the apply chamber 7a to operate the torque converter 2. The apply chamber 7a filled with the oil decreases oil pressure in the release chamber 7b so that the lock-up clutch 5 is set in a locking-up state while engaged with a front cover 8. Oil pressure in the release chamber 7b is adjusted for slip pressure control to slide the lock-up clutch 5.

The forward/backward-switching mechanism 3 has a forward clutch 11 for transferring rotation of the turbine shaft 6 as the output shaft of the torque converter 2 to the CVT 4 in a forward direction and a backward brake 12 for transferring rotation of the turbine shaft 6 to the CVT 4 in a backward direction.

Oil supplied into a clutch oil chamber 11a to engage the forward clutch 11 for transferring the rotation of the turbine shaft 6 to the CVT 4 in the forward direction. On the other hand, oil supplied into a brake oil chamber 11a to engage the backward brake 12 for transferring the rotation of the turbine shaft 6 to the CVT 4 in the back direction for deceleration.

The CVT 4 has a primary shaft 13 as the input shaft connected to the forward/backward-switching mechanism 3 and a secondary shaft 14 as the output shaft provided in parallel to the primary shaft 13.

The primary shaft 13 has a primary pulley 15 that has a fixed pulley 15a fixed at the primary shaft 13 and a slidable pulley 15b having grooves with a variable width (cone surface groove) and attached to the primary shaft 13 via ball splines, etc., so that it is slidable in the shaft direction.

The secondary shaft 16 has a secondary pulley 16 that has a fixed pulley 16a fixed at the secondary shaft 13 and a slidable pulley 16b having grooves with a variable width and attached to the second shaft 14, like the slidable pulley 15b, so that it is slidable in the shaft direction.

A belt 17 is passed around the primary and the secondary pulleys 15 and 16. Change in groove width for both pulleys 15 and 16 to vary a winding ratio of the belt 17 to the pulleys transfers rotation of the primary shaft 13 to the secondary shaft 14 with continues transmission.

The rotation of the secondary shaft 14 is transferred to wheels 19a and 19b via a set of gears having deceleration gears and a differential device 18. The wheels 19a and 19b are front wheels for front-wheel drive.

The basic structure of the CVT driving mechanism disclosed above is disclosed in detail in, for example, Japanese Un-Examined Patent Publication No. 10-325458.

Figure 3:
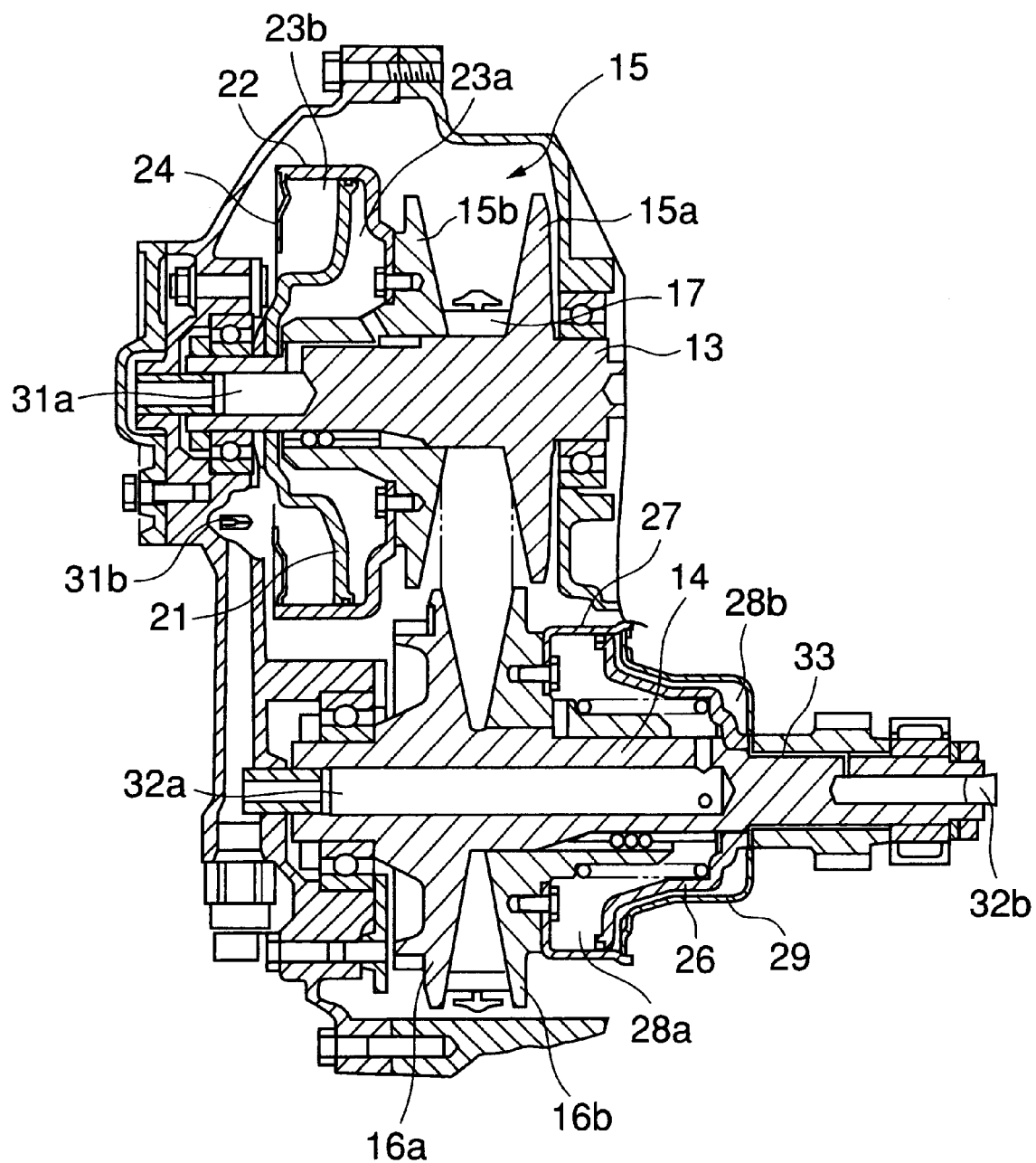
FIG. 3 is a sectional view illustrating a detailed structure of the CVT 4 shown in FIG. 2.

FIG. 3 is a sectional view illustrating a detailed structure of the CVT 4 shown in FIG. 2.

Fixed at the primary shaft 13 is a plunger 21 having a cylinder and a disc for varying a groove-width of the primary pulley 15. Fixed to the slidable pulley 15b is a primary cylinder 22 that is slidably contact with the outer surface of the plunger 21. An oil chamber 23a is formed between the plunger 21 and the slidable pulley 15b. A balance oil chamber 23b is formed between a cover 24 provided at an opening end of the primary cylinder 22 and the plunger 21.

Fixed at the secondary shaft 14 is a plunger 26 having a tapered cylinder for varying a groove-width of the secondary pulley 16. Fixed to the slidable pulley 16b is a secondary cylinder 27 that is slidably contact with the outer surface of the plunger 26. An oil chamber 28a is formed between the plunger 26 and the slidable pulley 16b. A balance oil chamber 28b is formed between a cover 29 provided at an opening end of the secondary cylinder 27 and the plunger 26.

Oil supplied into the oil chamber 23a in the primary cylinder 22 to increase in volume slides the slidable pulley 15b to the fixed pulley 15a side with the cylinder 22 to make narrow the groove-width of the primary pulley 15 whereas decrease in volume to make wider the groove-width.

Oil supplied into the oil chamber 28a in the secondary cylinder 27 to increase in volume slides the slidable pulley 16b to the fixed pulley 16a side with the cylinder 27 to make narrow the groove-width of the secondary pulley 16 whereas decrease in volume to make wider the groove-width.

An oil supply port 31a is formed in the primary shaft 13, that is connected to the oil chamber 23a in the primary cylinder 22 for supplying oil to the chamber 23a. An oil supply plug 31b is provided to face an opening formed by the cover 24 and the plunger 21 for supplying oil to the balance oil chamber 23b.

An oil supply port 32a is formed at the secondary shaft 14, that is connected to the oil chamber 28a in the secondary cylinder 27 for supplying oil to the chamber 28a. An oil supply nozzle 32b is provided to be connected to an oil line 33 formed in the secondary shaft 14 for supplying oil to the balance oil chamber 28b.

While the CVT 4 is operating, centrifugal oil pressure is generated in the oil chamber 23a due to rotation of the primary pulley 15. The centrifugal oil pressure is applied to the slidable pulley 15b so that the belt 17 is pressed onto the pulley 15b whereas centrifugal oil pressure is also generated in the balance oil chamber 23b in the opposite direction.

Likewise, while the CVT 4 is operating, centrifugal oil pressure is generated in the oil chamber 28a due to rotation of the secondary pulley 15 whereas centrifugal oil pressure is also generated in the balance oil chamber 28b in the opposite direction.

Figure 4:
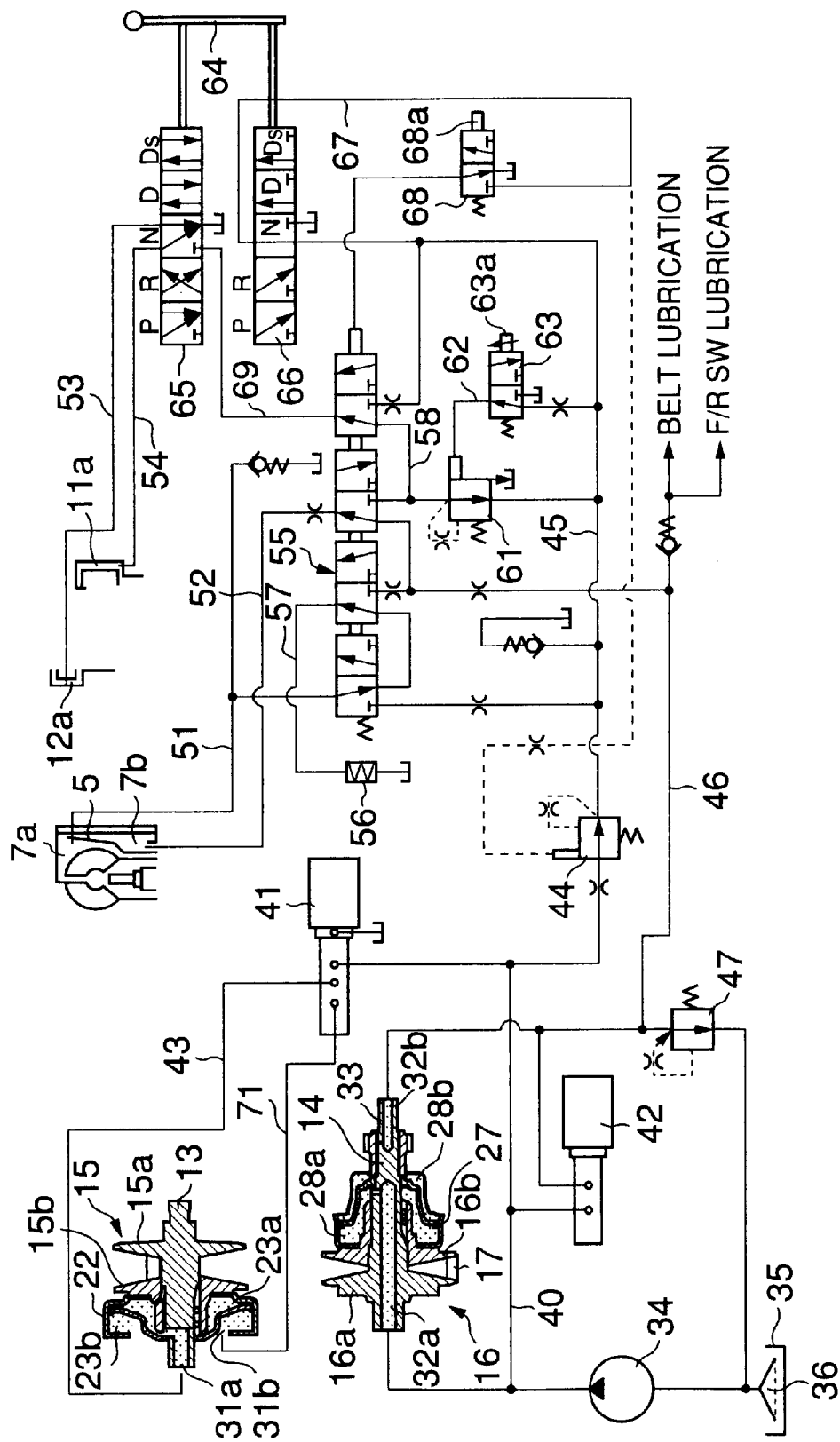
FIG. 4 is a circuit diagram of the first preferred embodiment of a CVT oil-pressure control apparatus according to the present invention.

FIG. 4 is a circuit diagram of the first preferred embodiment of a CVT oil-pressure control apparatus according to the present invention.

The torque converter 2, the forward/backward-switching mechanism 3 and the CVT 4 illustrated in FIG. 2 are operated by oil pressure from an oil pump 34 shown in FIG. 4.

The inlet of the oil pump 34 is connected to an oil pan 35 via an oil strainer provided in the oil pan 35. The outlet of the oil pump 34 is connected to an oil supply port 32a and also to a secondary pressure port of a secondary valve 42 through a line-pressure line 40 as a secondary pressure pipe.

The secondary valve 42 adjusts a secondary oil pressure applied to the oil chamber 28a to meet a transfer capacity required for the belt 17. In detail, the secondary oil pressure is increased for a large engine output for hill-climbing or rapid acceleration to prevent the belt 17 from a slip. On the other hand, the secondary oil pressure is decreased for decreasing a loss of the oil pump 34 and improving transfer efficiency.

The line-pressure line 40 is connected to a line-pressure port of a primary valve 41. The line-pressure port is connected to an oil supply port 31a through a primary-pressure line 43. The primary valve 41 adjusts a primary oil pressure to meet a target speed ratio or vehicle speed, for varying the groove-width of the primary pulley 15 to control vehicle speed.

The line-pressure line 40 is also connected to a clutch-pressure line 45 via a clutch-pressure valve 44. A clutch-pressure oil is supplied, through the clutch-pressure line 45, to the clutch oil chamber 11a of the forward clutch 11 in the forward/backward-switching mechanism 13, the brake oil chamber 12a of the backward brake 12 and the apply chamber 7a of the lock-up clutch 5.

The clutch pressure on the clutch-pressure line 45 is adjusted based on a line pressure. An external pilot pressure applied to the clutch-pressure valve 44 adjusts an oil pressure in the clutch-pressure line 45 to a low pressure whereas the oil pressure is adjusted at a pressure, when the external pilot pressure is stopped, higher than that when it is applied.

A lubricant-pressure line 46 is connected to a drain port of the secondary valve 42. Oil is supplied, through the lubricant-pressure line 46, to the forward/backward-switching mechanism and the belt 17 for lubrication. The lubricant-pressure line 46 is also connected to an oil supply nozzle 32b for applying oil pressure to the balance oil chamber 28b of the secondary pulley 16. The lubricant pressure on the lubricant-pressure line 46 is adjusted based on a drain pressure of the secondary valve 42 by a lubricant-pressure valve 47.

A switch valve 55 is provided for controlling connection between the lubricant-pressure line 46 and the clutch-pressure line 45 described above and a pressure-apply line 51 connected to the apply chamber 7a of the lock-up clutch 5, a pressure-release line 52 connected to the release chamber 7b, a brake switching-pressure line 53 connected to the brake oil chamber 12a and a clutch switching-pressure line 54 connected to the clutch oil chamber 11a.

The switch valve 55 is provided with four components each has a 3-port switching valve structure which is switched between the following two positions:

The first position is that the lock-up clutch 5 is released in an F & R mode in which no external pilot pressure is applied, as illustrated in FIG. 4, or a vehicle speed is made slower than a predetermined speed.

The second position is that the lock-up clutch 5 is locked due to an external pilot pressure application.

Figure 5A:
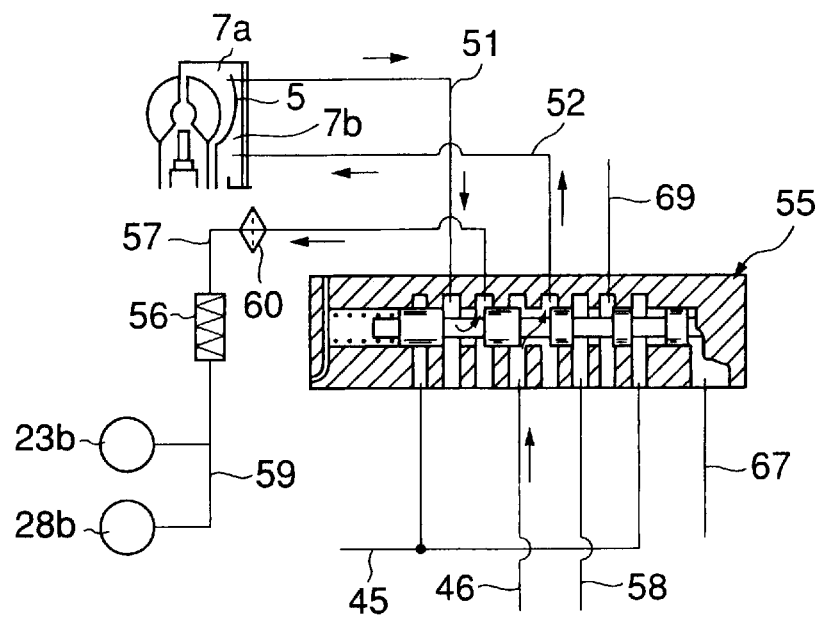
FIGS. 5A and 5B are sectional views illustrating the switch 55 in the first and the second positions, respectively, for the lock-up clutch 5.
Figure 5B:
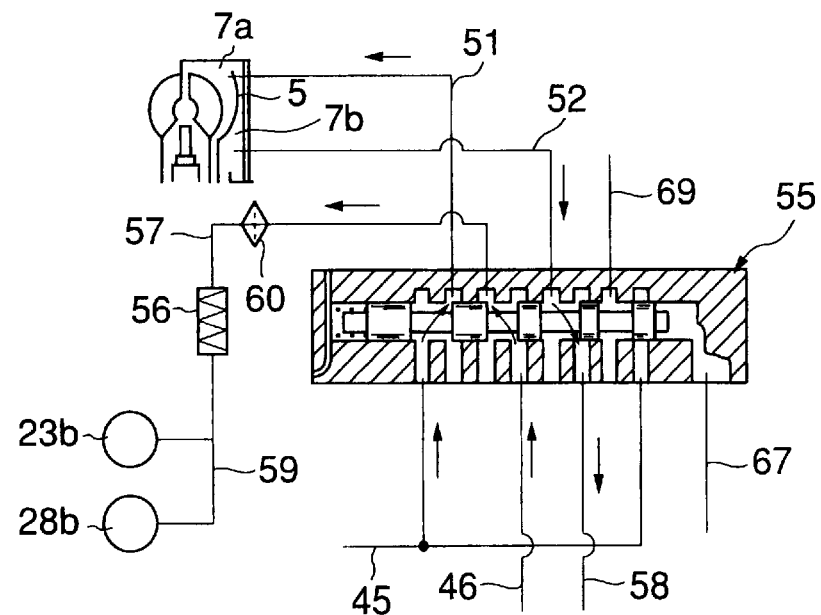

FIGS. 5A and 5B are sectional views illustrating the switch valve 55 in the first and the second positions, respectively, for the lock-up clutch 5, as described above.

While the lock-up clutch 5 has been released, as illustrated in FIGS. 4 and 5A, the switch valve 55 connects the lubricant-pressure line 46 and the pressure-releasing 52, and also a cooling line 57 and the pressure-apply line 51.

The cooling line 57 is connected to an oil cooler 56 via an automatic transmission fluid (ATF) filter 60. A balance oil-pressure line 59 is connected to the oil cooler 56. The balance oil-pressure line 59 is also connected to the balance oil chamber 23b formed in the primary cylinder 22 of the primary pulley 15 and the balance oil chamber 28b formed in the secondary cylinder 27 of the secondary pulley 16.

When the switch 55 is turned onto the first position in which the lock-up clutch is released, the torque converter 2 is operated to the F & R mode in which oil pressure applied to the forward/backward-switching mechanism 3 is controllable. Oil set at a lubricating pressure is supplied to the release chamber 7b, discharged from the apply chamber 7a and passed through the oil cooler 56, and then supplied to the balance oil chambers 23b and 28b through the balance oil line 59.

On the other hand, when the switch valve 55 is turned onto the second position in which the lock-up clutch is locked, as illustrated in 5B, the clutch-pressure line 45 and the pressure-applying line 51 are connected for supplying oil set at a clutch pressure to the apply chamber 7a while a slip-pressure line 58 connected to the clutch-pressure line 45 is connected to the pressure-release line 52.

The slip-pressure line 58 is connected to a slip-pressure adjusting valve 61. The adjusting valve 61 adjusts a slip pressure applied to the slip-pressure line 58 in the range from the pressure the same as a clutch pressure to zero according to an external pilot pressure applied to an external pilot chamber of the adjusting valve 61.

A slip-pressure at zero locks the lock-up clutch 5 into a lock-up mode, and it is released when the clutch-pressure becomes the same as the clutch pressure. Adjustment in slip-pressure makes possible slip control for the lock-up clutch 5 in which difference in rotation of the lock-up clutch 5 is always controlled as constant.

The lock-up clutch 55 at the second position in which the lock-up clutch is locked, allows oil from the lubricant-pressure line 46 is cooled while flowing through the cooling line 57, and then supplied to the balance oil chambers 23b and 28b through the balance oil line 59.

As disclosed, oil is always supplied to the oil cooler 56 by means of lubricant pressure without respect to the state of the switch valve 55.

A pilot-pressure line 62 is connected between a pilot port of the slip-pressure adjusting valve 61 and the clutch-pressure line 45 for applying an external pilot pressure to the adjusting valve 61.

A pilot-pressure adjusting valve 63 is connected to the pilot-pressure line 62 for pilot pressure control. The adjusting valve 63 is energized by supplying power to a solenoid 63a.

Connected to a control lever, or a selector lever 64, for driving-mode switching and provided in a vehicle, are a manual valve 65 and a reverse signal valve 66, both are interlocked with the lever 64. The valves 65 and 66 are shifted among five positions that correspond to drive ranges of parking (P), reverse (R), neutral (N), drive (D) and sports drive (Ds) set by the selector lever 64.

A 3-port solenoid-type switching valve 68 is provided in midstream of a pilot-pressure line 67 that connects the clutch-pressure line 45 to the external pilot chamber of the switching valve 55 via the reverse signal valve 66. A solenoid 68a of the switching valve 68 is energized to switch the switch valve 55 at a lock-up control position so that the lock-up clutch 5 is locked whereas it is switched to the F & R mode when the solenoid 68a is turned off, as illustrated in FIG. 4.

The pilot-pressure line 67 is connected to the external pilot chamber of the clutch-pressure valve 44, as illustrated with dashed line in FIG. 4. The reverse signal valve 66 set in the range N, D or Ds allows a clutch-pressure to be applied to the external pilot chamber of the clutch valve 44. It is set at a low pressure in the pilot chamber. Contrary to this, the reverse signal valve 66 set in the range P or R does not allow a clutch-pressure to be applied to the external pilot chamber of the clutch valve 44. The clutch-pressure is set as lower than the pressure set in the range N, D or Ds.

A pressure-switching line 69 is provided between the switch valve 55 and the manual valve 65. The switch valve 55 in the F & R mode switches the pressure-switching line 69 to be connected to the slip-pressure line 58. On the contrary, the switch valve 55 in the lock-up control position, described above, switches the pressure-switching line 69 to be connected to the clutch-pressure line 45.

The pressure-switching line 69 is also connected to the clutch-switching pressure line 54 via the manual valve 65 when this valve is set in the range D or Ds by the operation of the selector lever 64. The line 69 is, however, connected to the brake-switching pressure line 53 when the manual valve 65 is set in the range R.

Amounts of oil required for the balance oil chambers 23b and 28b are discussed.

Oil remains at the bottom of the balance chamber 23b around the opening of the chamber while the pulleys are not rotating whereas it is attached to the inner surface of the cylinder of the chamber 23b by centrifugal force while the pulleys are rotating. The balance chamber 23b is not filled with enough oil while the pulleys are not rotating. A sufficient amount of oil is thus required for attaining an enough centrifugal oil pressure.

When the speed range is shifted for high-speed driving by operation of the pulleys, the oil chamber 23a of the primary pulley 15 is filled with oil to increase its volume whereas the volume of the balance oil chamber 23b is decreased, but that of the balance oil chamber 28b of the secondary pulley 16 is increased.

On the other hand, when the speed range is shifted for low-speed driving, the volume of the balance oil chamber 23b of the primary pulley 15 is increased whereas, that of the balance oil chamber 28b of the secondary pulley 16 is decreased.

As disclosed, the volumes of the balance oil chambers 23b and 28b of the primary pulley 15 and the secondary pulley 16, respectively, vary whenever the speed range is changed by the operation of the pulleys.

The balance oil chambers 23b and 28b are always filled with oil supplied by the oil cooler 56 that is filled with a constant amount of oil, as disclosed above.

The amount of oil supplied to the balance oil chambers 23b and 28b for rotation of the pulleys are therefore saved by the oil only supplied to the oil cooler 56, that decreases the amount of oil to be supplied to all lubricant-pressure lines, thus decreasing a mechanical loss of the oil pump 34 for improvement in fuel consumption.

The amounts of oil to be supplied to the balance oil chambers 23b and 28b can be adjusted by means of orifices or diaphragms provided in midstream of the balance oil line 59.

Figure 6:
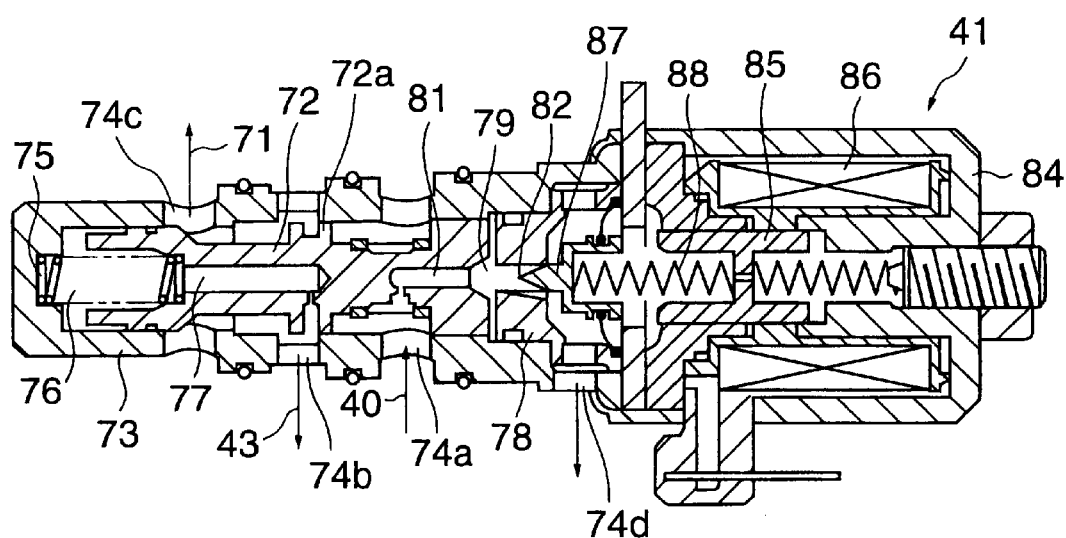
FIG. 6 is an enlarged sectional view illustrating the primary valve 41.

FIG. 6 is an enlarged sectional view illustrating the primary valve 41.

A valve housing 73 that contains a spool 72 slidable in the shaft direction has a line-pressure port 74a connected to the line-pressure line 40, a primary-pressure port 74b connected to the primary-pressure line 43 and a drain port 74c connected to the balance oil line 71. The opening of each port is adjusted by a valve 72a provided at the spool 72.

Provided at one end of the spool 72 is a feed-back chamber 76 that is attached a coil spring 75. The chamber 76 is connected to the primary-pressure port 74b via a communicating vessel 77 formed in the spool 72.

A pilot-pressure chamber 79 is provided between the other end of the spool 72 and a valve sheet 78 attached to a valve housing 73. The pilot-pressure chamber 79 is connected to the line-pressure port 74a via a communicating vessel 81 formed in the spool 72.

The valve sheet 78 has a communicating vessel 82 connected to the pilot-pressure chamber 79. The communicating vessel 82 is connected to a pilot drain port 74d formed in the valve housing 73.

Attached to the valve housing 73 is a solenoid 84 having a coil 86 that energizes a moving core 85. A coil spring 88 is disposed between the moving core 85 and a needle valve 87 that adjusts the opening of the communicating vessel 82.

The oil pressure in the pilot-pressure chamber 79 is adjusted according to a line pressure and a pilot drain amount that is decided by the solenoid 84.

The opening of the needle valve 87 can be set when the solenoid 84 is a duty-solenoid type in which an on/off time for supplying power to the coil 86 of the solenoid 84 is adjusted or a linear-solenoid type in which power is adjusted.

The spool 72 is operated based on balance between an oil pressure in the feed-back chamber 76 to which a primary pressure is applied and that in the pilot-pressure chamber 79 to which oil is supplied at a line pressure and adjusted by the solenoid 84. The primary pressure is adjusted based on balance between the oil pressure applied from the line-pressure line 40 and a drained amount.

A line pressure-adjusted oil is then supplied to the oil chamber 23a of the primary pulley 15 while a drain oil is supplied from the primary-pressure line 43 to the balance oil chamber 23b. The oil carried along the primary-pressure line 43 is always drained to the balance oil line 71 while the primary pressure is lower than the line pressure during control of the pulleys for shift-down.

An amount of oil required for the balance oil chamber 23b is discussed.

Oil remains at the bottom of the balance chamber 23b around the opening of the chamber while the pulleys are not rotating whereas it is attached to the inner surface of the cylinder of the chamber 23b by centrifugal force while the pulleys are rotating. The balance chamber 23b is not filled with enough oil while the pulleys are not rotating. A sufficient amount of oil is required for attaining an enough centrifugal oil pressure, as already discussed.

The primary pressure is adjusted based on balance between the oil pressure applied from the line-pressure line 40 and a drained amount, as disclosed, which can compensate for shortage of oil flow to the balance oil line 70 as a drainage.

When the speed range is shifted for high-speed driving by operation of the pulleys, the oil chamber 23a of the primary pulley 15 is filled with oil to increase its volume whereas the volume of the balance oil chamber 23b is decreased. Oil is then supplied from the line-pressure line 40 to the primary-pressure line 43 while a drained amount to the balance oil line 71 is decreased for maintaining the primary pressure. A further supply of oil to the balance oil chamber 23b is not required because it has been filled with oil and its volume has been decreased.

On the other hand, when the speed range is shifted for low-speed driving, the volume of the oil chamber 23a is decreased whereas, that of the balance oil chamber 23b is increased because the oil is drained from the oil chamber 23a. All oil is drained from the oil chamber 23a to the balance oil chamber 23b through the balance oil line 71 because of the structure of the primary valve 41.

The amount of oil supplied to the balance oil chamber 23b for rotation of the primary pulley 15 is therefore saved by the drained amount to the balance oil line 71 as a drainage for the primary valve 41, that decreases the amount of oil to be supplied to the lubricant-pressure line 46, thus decreasing a mechanical loss of the oil pump 34 for improvement in fuel consumption.

Figure 7:
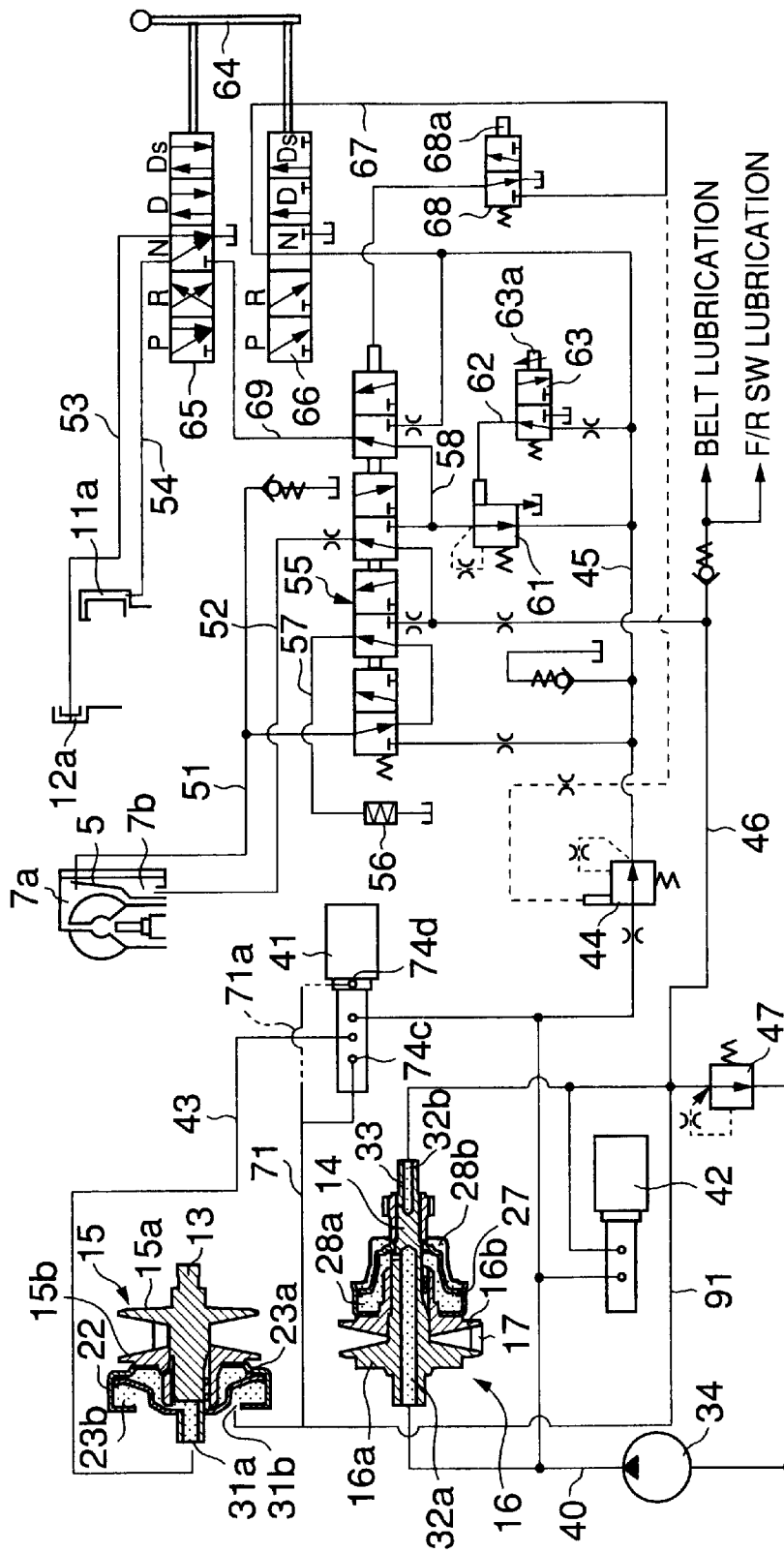
FIG. 7 is a circuit diagram of the second preferred embodiment of a CVT oil-pressure control apparatus according to the present invention.

FIG. 7 is a circuit diagram of the second preferred embodiment of a CVT oil-pressure control apparatus according to the present invention.

Elements in this embodiment that are the same as or analogous to elements in the first embodiment (FIG. 4) are referenced by the same reference numbers and will not be explained in detail.

In this embodiment, the lubricant-pressure line 46 is connected to the balance oil chamber 23b through a balance-lubricant-pressure line 91 for supplying oil from the line 46 to the chamber 23b.

Supply of oil to the balance oil chamber 23b from the lubricant-pressure line 46 and a drain port 74c of a primary valve 41a achieves high response of the oil-pressure control apparatus according to the present invention, with no increase in discharge amount from the oil pump 34.

As shown in FIG. 7, a pilot drain port 74d of the primary valve 41a is connected to a balance oil line 71a represented by a chain double-dashed line, to supply oil from the drain port 74d to the balance oil chamber 23b.

The balance oil chamber 23b is not filled with oil enough for canceling centrifugal oil pressure to the oil chamber 23a when the primary pulley 15 starts to rotate, as already discussed, oil is, however, drained from the pilot drain port 74d to the balance oil chamber 23b, thus improving oil filling rate to the chamber 23b.

This structure achieves high control response after drive range has been changed with no increase in discharge amount from the oil pump 34.

In FIG. 7, the balance oil line 71a represented by the chain double-dashed line only may be provided without the balance-lubricant-pressure line 91. Or, both lines can be provided.

Figure 8:
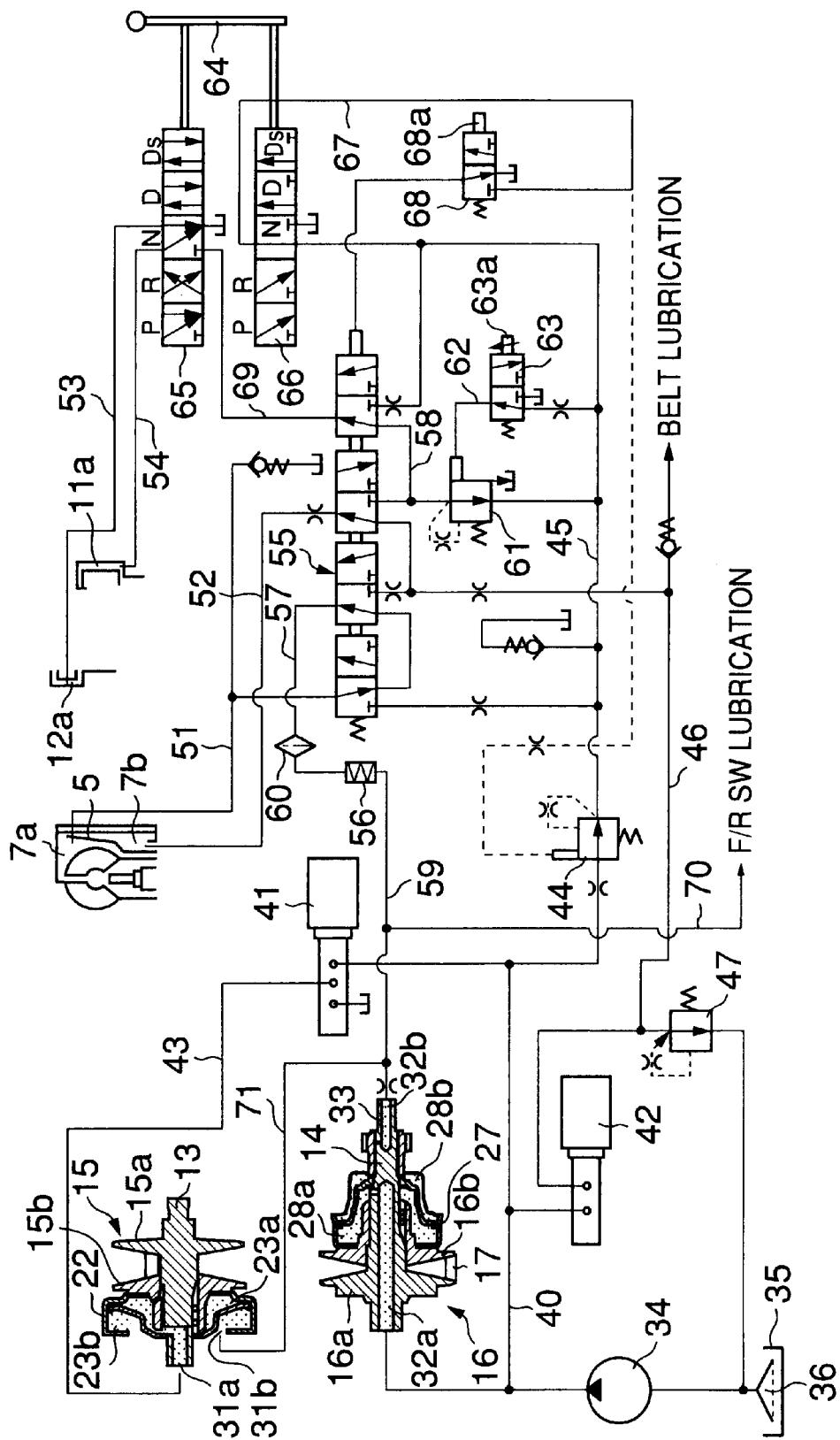
FIG. 8 is a circuit diagram of the third preferred embodiment of a CVT oil-pressure control apparatus according to the present invention.

FIG. 8 is a circuit diagram of the third preferred embodiment of a CVT oil-pressure control apparatus according to the present invention.

Elements in this embodiment that are the same as or analogous to elements in the foregoing embodiments are referenced by the same reference numbers and will not be explained in detail.

In this embodiment, a lubricant-pressure apply line 70 is connected to the balance oil line 59 for supplying oil that has passed through the oil cooler 56 to the forward/backward-switching mechanism 3 for lubrication.

The amounts of oil to be supplied to the balance oil chambers 23b and 28b of the primary pulley 15 and the secondary pulley 16, respectively, are set to meet the change in volume of the chambers.

A constant amount of oil is, however, usually supplied from the oil cooler 56 without respect to the movement of the pulleys for shifting driving range. This causes overflow of oil from the balance oil chambers 23b and 28b when their volumes do not vary during no rotation of the pulleys.

Supply of oil to the balance chambers 23b and 28b should be controlled as little as possible because a lot of oil around the pulleys would work as resistance to the rotation of the pulleys.

An oil amount to be supplied to the oil cooler 56 is decided according to heat generated by the CVT 4. Thus, a lot of oil is usually supplied to the balance oil chambers more than the amount required for the chambers.

However, according to the present invention, an amount of oil which would otherwise overflow from the balance oil chambers is used for lubrication of the forward/backward-switching mechanism 3 not from the lubricant-pressure line.

Therefore, the present invention achieves decrease in oil amount required for the lubricant-pressure line and also decrease in agitation resistance to the pulleys which would otherwise be generated due to a lot of oil to the pulleys.

The amounts of oil to be supplied to the balance oil chambers 23b and 28b and also the forward/backward-switching mechanism 3 can be adjusted by means of an orifice or a diaphragm provided in midstream of the balance oil line 59 and the lubricant-pressure apply line 70.

Figure 9:
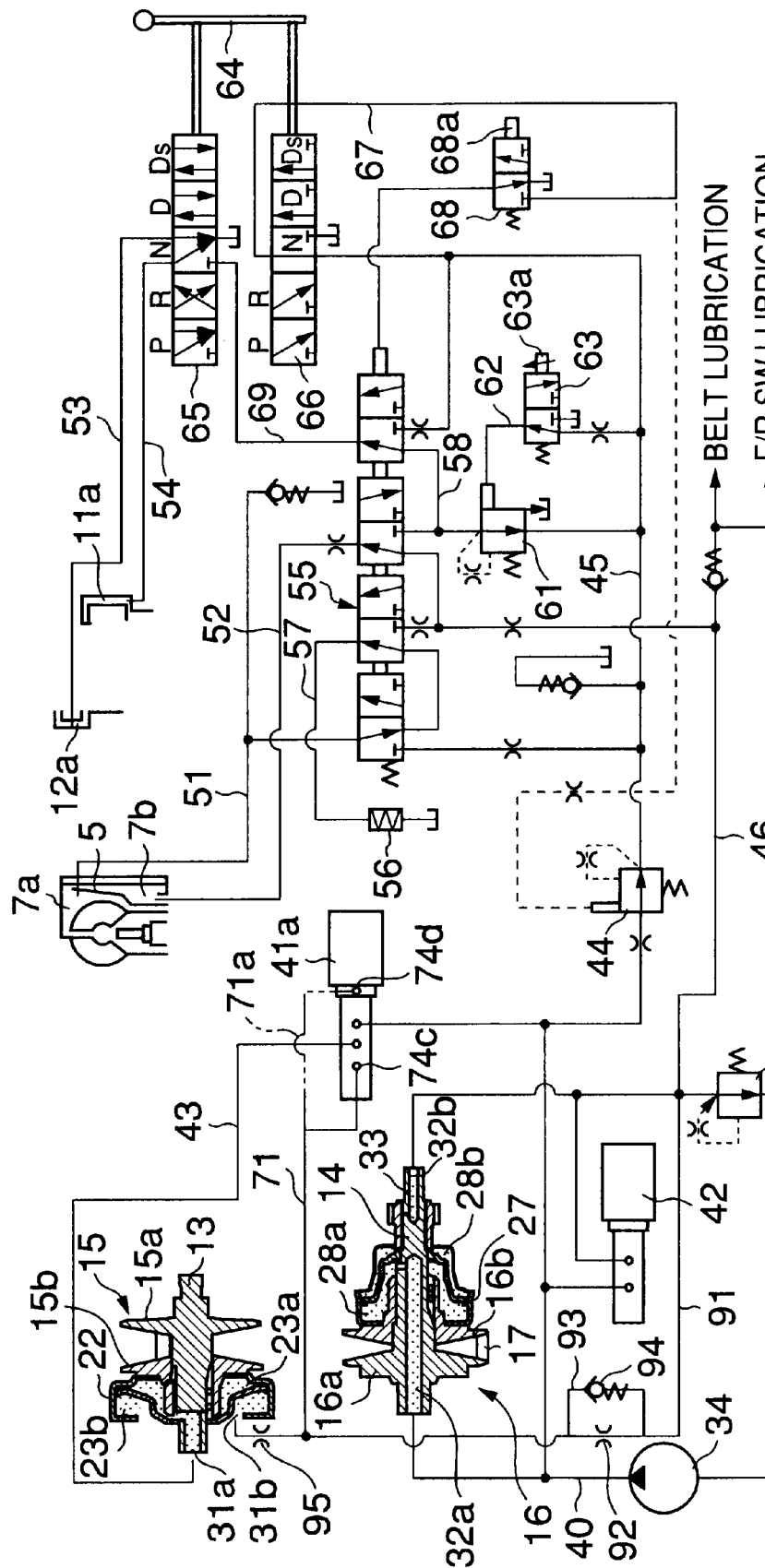
FIG. 9 is a circuit diagram of the fourth preferred embodiment of a CVT oil-pressure control apparatus according to the present invention.

FIG. 9 is a circuit diagram of the fourth preferred embodiment of a CVT oil-pressure control apparatus according to the present invention.

Elements in this embodiment that are the same as or analogous to elements in the foregoing embodiments are referenced by the same reference numbers and will not be explained in detail.

In this embodiment, an orifice 92 is provided in midstream of the balance lubricant-pressure line 91 that connects the lubricant-pressure line 46 and the balance oil chamber 23b. The orifice 92 adjusts the amount of oil supplied through the lubricant-pressure line 46. A check valve 94 is provided in midstream of a feed-back line 93, as parallel to the orifice 92, for allowing oil flow to the lubricant-pressure line 46 but blocking a reverse oil flow. Also provided is an orifice 95 in the vicinity of the inlet of the balance oil chamber 23b.

In FIG. 9, an increase in oil amount supplied to the balance oil chamber 23b causes increase in oil pressure to the balance oil line 71 by the orifice 95. However, an amount of oil flowing through the orifice 92 is decided according to the difference between a lubricant pressure and an oil pressure on the balance oil line 71. The oil amount supplied to the balance oil chamber 23b from the lubricant-pressure line 46 through the balance lubricant-pressure line 91 is therefore decreased.

A constant amount of oil supplied from the balance oil line 71 that carries a drain oil for the primary valve 41a causes increase in oil pressure on the balance oil line 71 higher than that on the lubricant-pressure line 46.

This results in that oil is blocked from flowing through the orifice 92 while oil is supplied, by the check valve 94, to the lubricant-pressure line 46 from the balance oil line 71, a pressure on the line 71 being sufficiently lower than the primary pressure.

Therefore, according to the present invention, when an oil amount supplied to the pulleys is increased for shifting to a high drive range, supply of oil to the balance oil line 71 from the lubricant-pressure line 46 is stopped while oil is supplied to the line 46 from the line 71 at a predetermined vehicle speed or more.

The present invention thus achieves decrease in the maximum oil amount to be supplied to the lubricant-pressure line 46 for compactness of the oil pump 34 and decreasing a mechanical loss of the pump to improve fuel consumption.

Also in this embodiment, oil drained from the pilot drain port 74d of the primary valve 41a can be supplied to the balance oil chamber 23b, as illustrated with a chain double-dashed line in FIG. 9.

Figure 10:
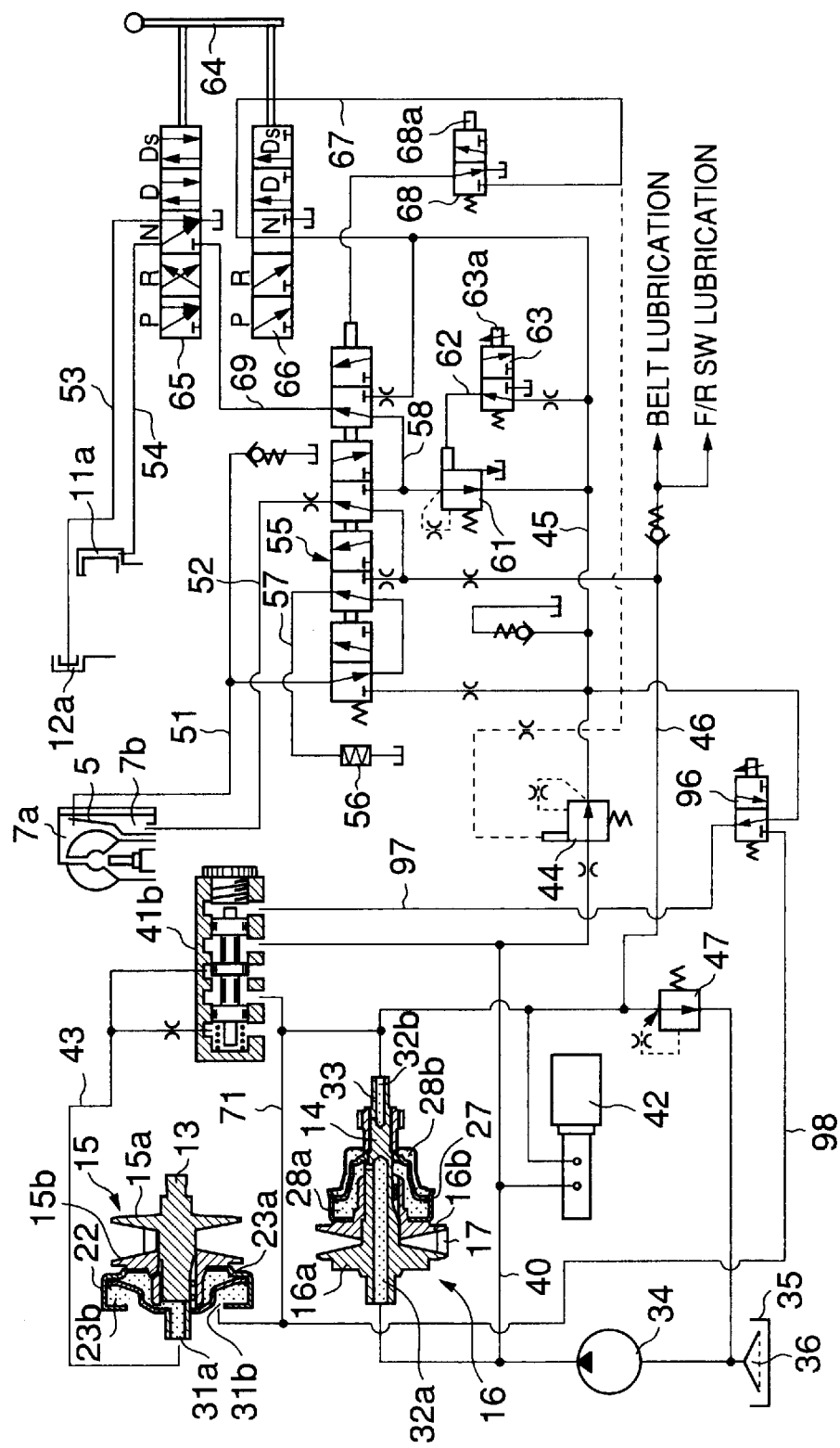
FIG. 10 is a circuit diagram of the fifth preferred embodiment of a CVT oil-pressure control apparatus according to the present invention.

FIG. 10 is a circuit diagram of the fifth preferred embodiment of a CVT oil-pressure control apparatus according to the present invention.

Elements in this embodiment that are the same as or analogous to elements in the foregoing embodiments are referenced by the same reference numbers and will not be explained in detail.

The primary valves 41 and 41a shown in FIGS. 4, 7 and 9 have the solenoid 84 attached to the valve housing 73, as illustrated in FIG. 6.

Contrary to this, a primary valve 41b shown in FIG. 10 is a spool valve that is energized by an external pilot pressure.

In FIG. 10, a magnetic valve 96 is provided in midstream of the clutch-pressure line 45, for adjusting an external pilot pressure based on a clutch pressure. The outlet port of the magnetic valve 96 is connected to a pilot port of the primary valve 41b through a pilot pressure line 97. The line-pressure line 40 is connected to a line-pressure port of the primary valve 41b. The primary-pressure line 43 is connected to a primary-pressure port of and further to an internal pilot chamber of the primary valve 41b. The balance oil line 71 is connected to a drain port of the primary valve 41b. A drain port of the magnetic valve 96 is connected to the balance oil chamber 23b through a balance oil line 98.

This structure offers a high oil-injection rate to the balance oil chamber 23b even though the primary valve 41b does not have a solenoid like shown in FIG. 6. According to this structure, oil can be drained from the magnetic valve 96 for adjusting an external pilot pressure to the balance oil chamber 23b. A 3-postion valve-type duty-solenoid valve or a linear solenoid-valve can be used as the magnetic valve 96.

Figure 11:
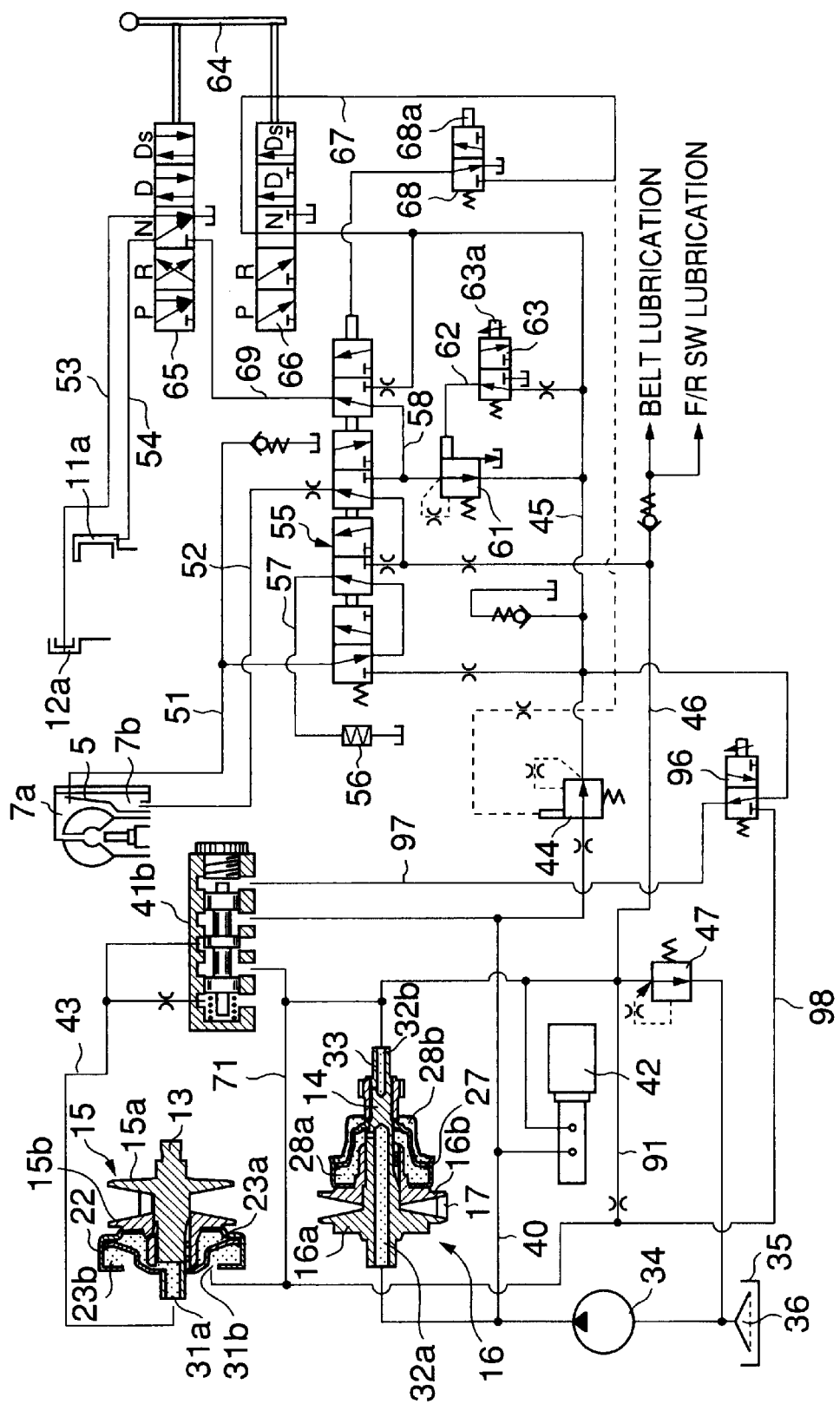
FIG. 11 is a circuit diagram of the sixth preferred embodiment of a CVT oil-pressure control apparatus according to the present invention.

FIG. 11 is a circuit diagram of the sixth preferred embodiment of a CVT oil-pressure control apparatus according to the present invention.

Elements in this embodiment that are the same as or analogous to elements in the foregoing embodiments are referenced by the same reference numbers and will not be explained in detail.

In this embodiment, a lubricant is supplied to the balance oil chamber 23b through a balance lubricant-pressure line 91. supplied to the balance oil chamber 23b in this embodiment are oil from the lubricant-pressure line 46, oil drained from the drain port of the primary valve 41b and also the drain oil from the magnetic valve 96.

Figure 12:
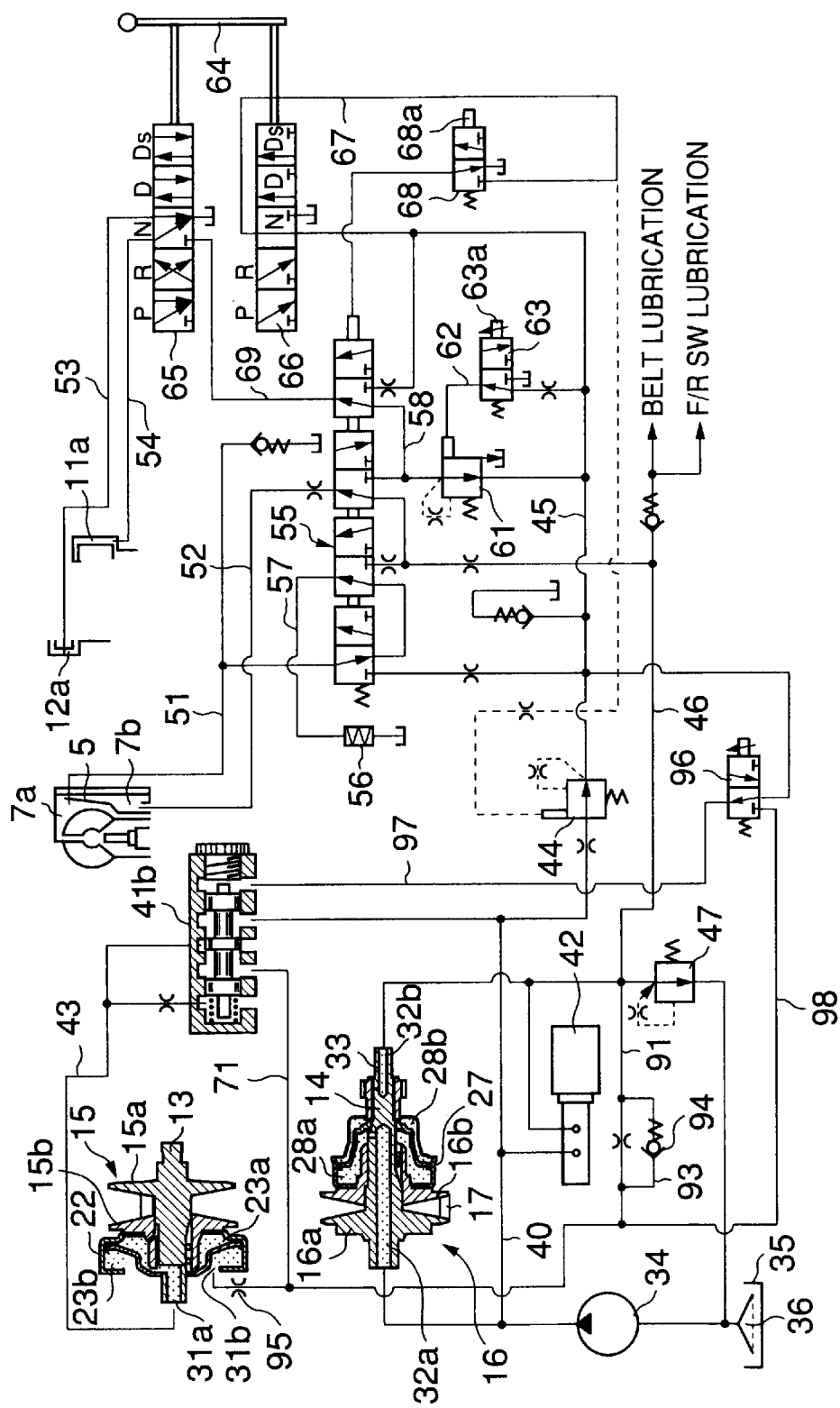
FIG. 12 is a circuit diagram of the seventh preferred embodiment of a CVT oil-pressure control apparatus according to the present invention.

FIG. 12 is a circuit diagram of the seventh preferred embodiment of a CVT oil-pressure control apparatus according to the present invention.

Elements in this embodiment that are the same as or analogous to elements in the foregoing embodiments are referenced by the same reference numbers and will not be explained in detail.

In this embodiment, the orifice 92 is provided in midstream of the balance lubricant-pressure line 91, that adjusts amount of oil supplied from the lubricant-pressure line 46. The check valve 94 is also provided in midstream of the feed-back line 93, as parallel to the orifice 92, for allowing flow of oil to the lubricant-pressure line 46 but blocking a reverse oil flow. Also provided is the orifice 95 in the vicinity of the inlet of the balance oil chamber 23b.

Figure 13:
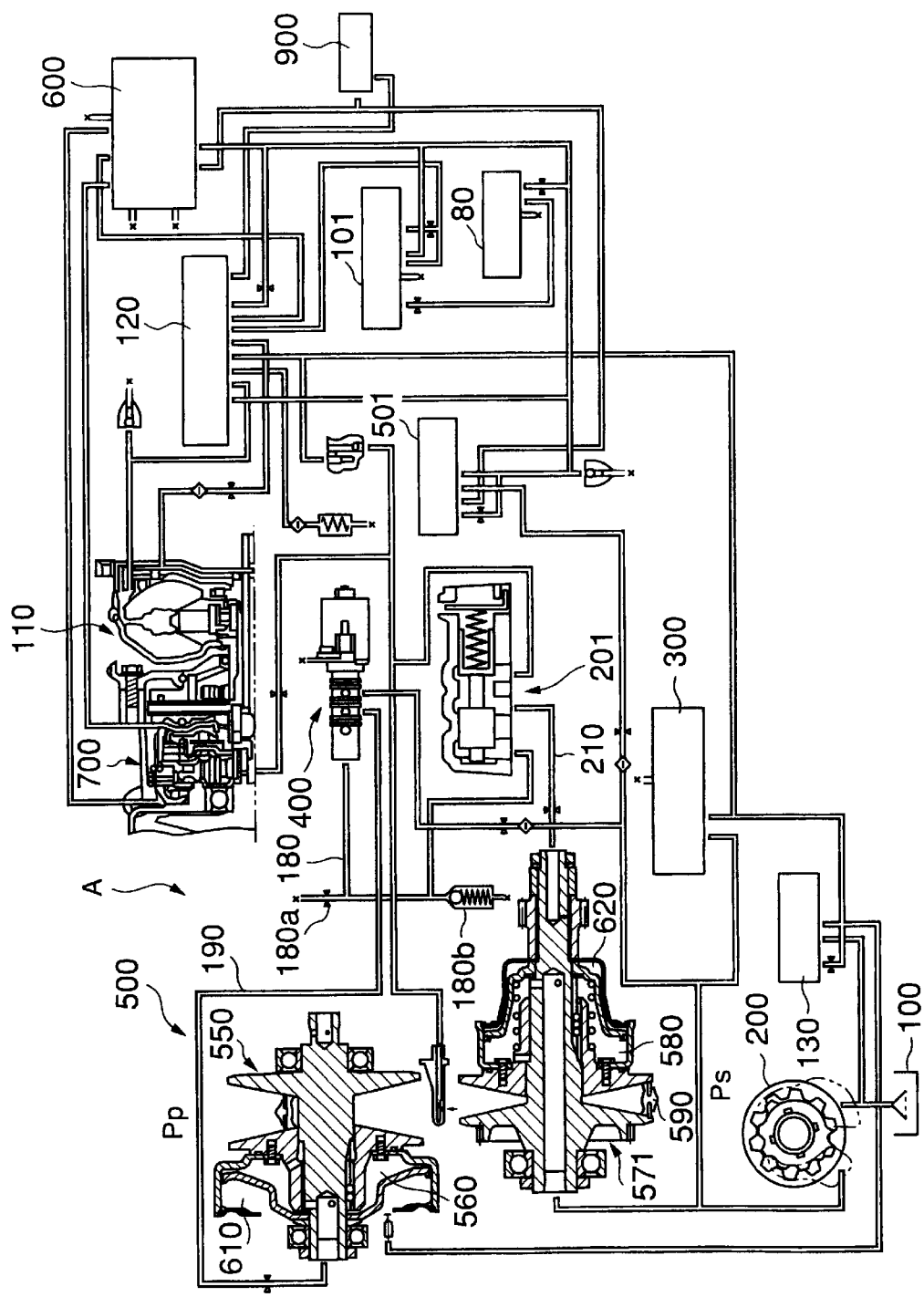
FIG. 13 is a circuit diagram of the eighth preferred embodiment of a CVT oil-pressure control apparatus according to the present invention.
Figure 14:
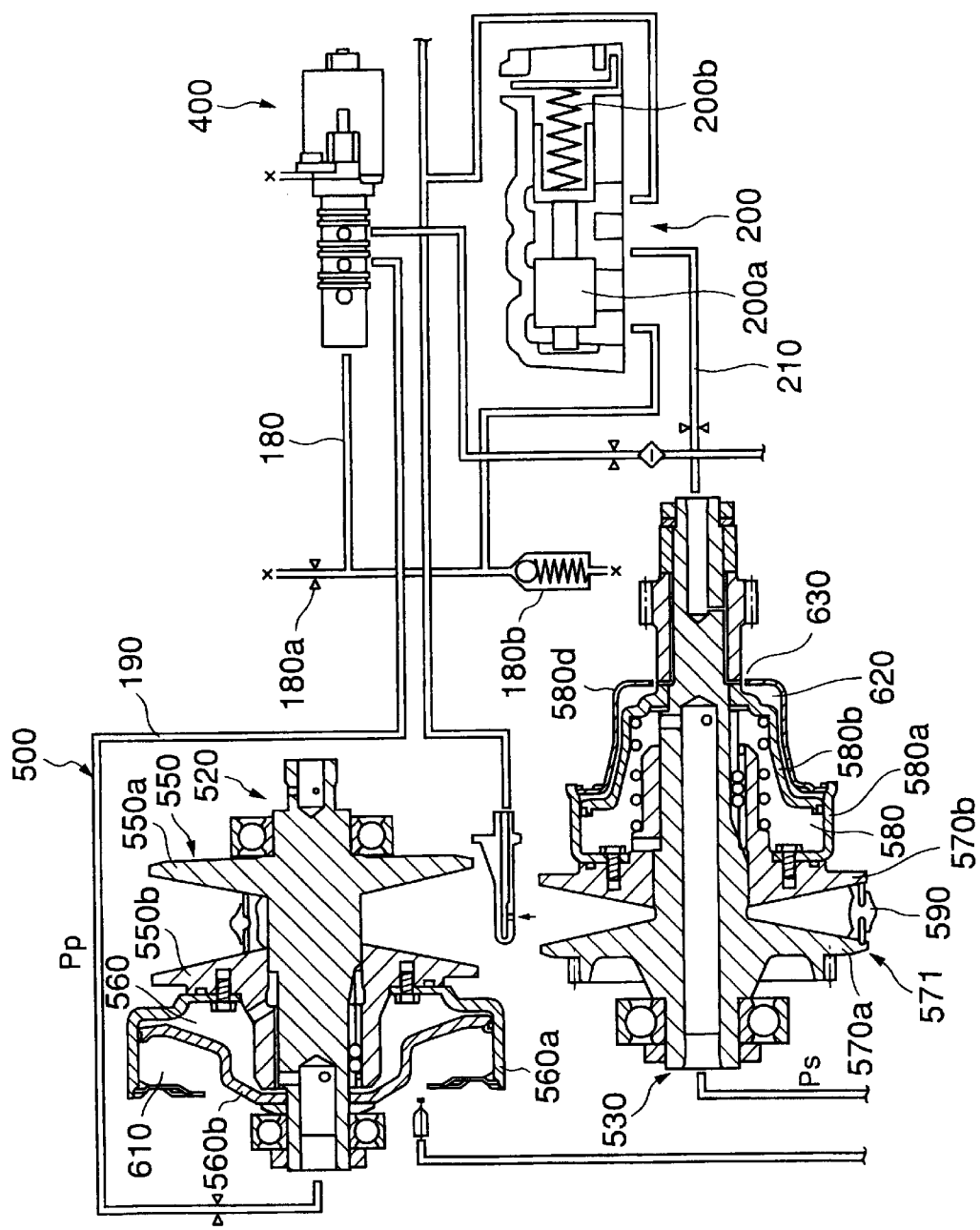
FIG. 14 is an enlarged view of the region "A" shown in FIG. 13.

FIG. 13 is a circuit diagram of the eighth preferred embodiment of a CVT oil-pressure control apparatus according to the present invention. FIG. 14 is an enlarged view of the region A shown in FIG. 13.

Figure 1A:
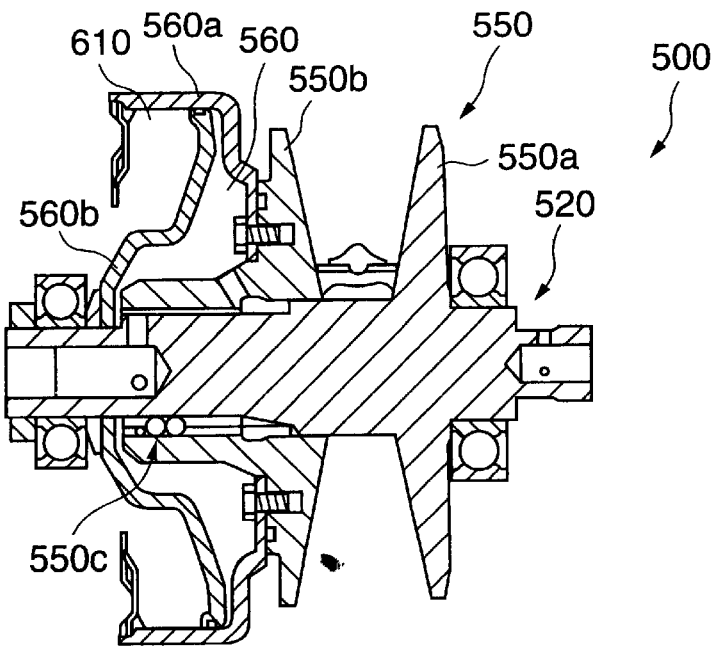
FIGS. 1A and 1B are sectional schematic views illustration of a well-known CVT.
Figure 1B:
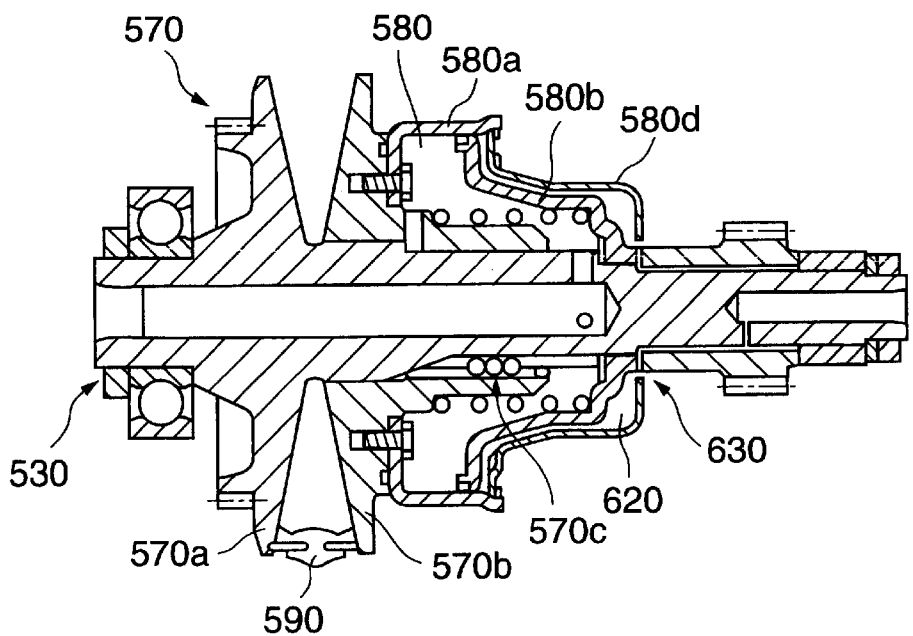

Elements in this embodiment that are the same as or analogous to elements shown in FIGS. 1A and 1B are referenced by the same reference numbers and will not be explained in detail.

An oil pan 100 is filled with a lubricant that is supplied to a secondary pulley 571 of a CVT 500 when a line pressure is Ps for oil discharged by an oil pump 200 driven by an engine (not shown). The line-pressure Ps is adjusted by a secondary valve 300 for attaining an adequate clumping power of a drive belt 590.

A primary pulley 550 is controlled with a primary pressure Pp that is adjusted by a primary valve 400 based on the line pressure Ps, to maintain the clumping power for control of driving ranges of the CVT 500.

Forward/backward-switching is performed by a forward/backward-switching mechanism 700 to which a clutch pressure that has been adjusted at a constant pressure by a clutch-pressure valve 501 based on the line pressure Ps is supplied after switched by a manual valve 600.

Oil pressure at each section is controlled by a slip-control valve 101 that is switched by a duty-solenoid 800 and an ON/OFF solenoid 900, for decreasing a switching shock while attaining a safety-locking function.

A lock-up clutch provided in a torque converter 110 is switched between ON/OFF of locking-up by switching a lock-up apply-pressure line and a lock-up release-pressure line according to a clutch pressure adjusted by a switch valve 120 and the slip-control valve 101 and also a lubricant pressure adjusted by a lubrication valve 130.

The lubricant pressure is applied, in addition to the lock-up control, for lubrication of the forward/backward-switching mechanism 700, the drive belt 590, a balance oil chamber 610 of the primary pulley 550, a balance oil chamber 620 of the secondary pulley 590, an ATF filter for restricting contamination to the lubricant and also increase in temperature in the CVT 500, and an oil cooler.

A balance chamber-control valve 200 is provided for controlling oil pressure applied to the balance oil chamber 620 of the secondary pulley 570. The control valve 200 is controlled by oil pressure generated in a drain line 180 of the primary valve 400 that controls the primary pulley-pressure Pp.

Provided in midstream of the drain line 180 are an orifice 180a for varying pressure to the oil-pressure control apparatus according to a drained flow to the primary valve 400 and a check valve 180b for maintaining the pressure in the drain line 180 at a predetermined pressure.

The primary valve 400 adjusts the pressure in an oil-pressure cylinder 560 of the primary pulley 550, or the primary pressure Pp to pressure lower than the line pressure Ps from the oil pump 200.

Figure 15:
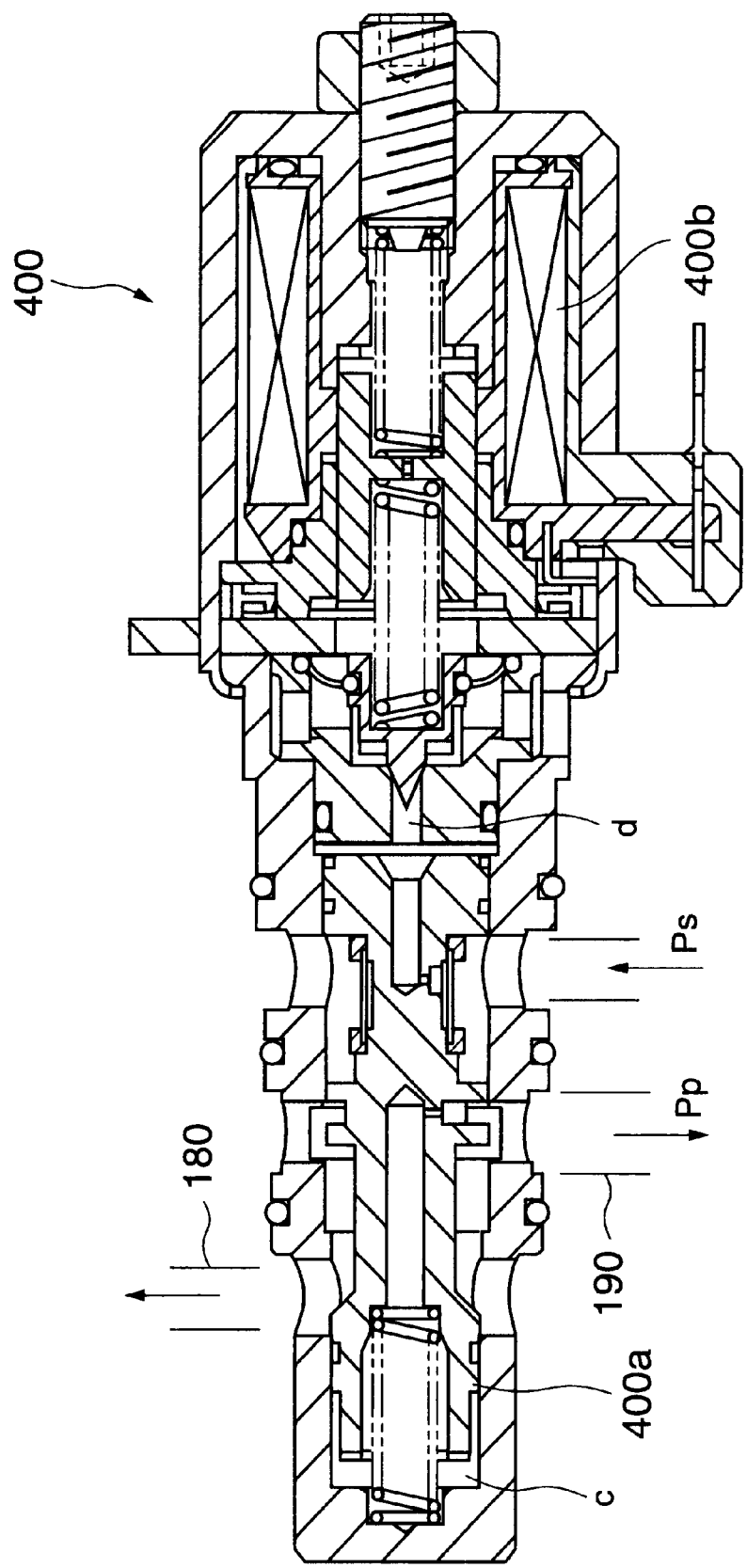
FIG. 15 is a sectional illustration of a structure of the primary valve 400.

FIG. 15 illustrates a structure of the primary valve 400.

The primary pressure Pp is controlled according to the balance between the pressure applied based on the line pressure Ps and that drained to the drain line 180.

A primary pressure Pp while the primary pulley 500 is rotating is lower than the line pressure Ps, hence a lubricant carried by a primary-pressure line 190 is always drained to the drain line 180.

A primary spool 400a of the primary valve 400 for controlling the primary pressure Pp is controlled according to a pressure balance between a feed-back pressure "c" applied based on the primary pressure Pp and a pilot pressure "d" applied based on the line pressure Ps and controlled by a linear solenoid 400*b*.

The pilot pressure "d" is controlled based on the pressure applied based on the line pressure Ps and a pilot-drain amount drained by the linear solenoid 400*b*.

Supply of lubricant to the primary-pressure line 190 is performed based on the line pressure Ps. The lubricant of the line 190 is drained to the drain line 180.

The balance chamber-control valve 200 that is controlled according to a drain amount to the drain line 180 has a spool 200*a* and a spring 200*b*, as shown in FIG. 14.

The spool 200*a* is pressed by the lubricant pressure applied by the drain line 180 against the spring 200*b* to close a lubricant-pressure line 210 connected to the balance oil chamber 620 of the secondary pulley 570 when the lubricant pressure becomes a predetermined value or more. The spool 200*a* is returned to its original position by the spring 200*b* when the oil pressure from the drain line 180 is decreased.

An amount of lubricant required for the balance oil chamber 620 of the secondary pulley 570 is discussed.

When the drive range is shifted from the LOW to OD side by the operation of the primary pulley 550, a lubricant is supplied to the oil-pressure cylinder 560 of the primary pulley 550 to increase the volume of the cylinder while decreasing that of the balance oil chamber 610.

The primary pressure Pp is applied to the oil-pressure cylinder 560 from the primary valve 400 through the primary pressure line 190 based on the line pressure Ps while an amount of oil drained from the primary valve 400 to the drain line 180 is decreased for maintaining an adequate amount of oil to the primary-pressure line 190.

The lubricant in the oil cylinder 580 of the secondary pulley 570 is drained to decrease it volume. The oil cylinder 580 is connected to the line at the line pressure Ps, so that the oil in the oil cylinder 580 is circulated into the Ps-pressure line as the volume of the oil cylinder 580 is decreasing.

The amount of oil required for the operation of the CVT 500 corresponds to the difference between an increasing volume of the oil cylinder 560 of the primary pulley 550 and a decreasing volume of the oil cylinder 580 of the secondary pulley 571.

An oil amount to be supplied through the lubricant-pressure line 210 to the balance oil chamber 620 has to meet the maximum increase in volume of the chamber 620 for maintaining centrifugal oil pressure generated by the balance oil chamber 620. A constant amount of oil is thus supplied to the balance oil chamber 620 via the balance chamber-control valve 200 through the lubricant-pressure line 210.

While the secondary pulley 571 is stopping, the lubricant in the balance oil chamber 620 is leaked out of the opening of the chamber 620, or a gap 630 formed between the shaft of the fixed pulley 570*a* and an end of the balance oil cylinder 580*d*, thus the lubricant being remaining on the bottom of the chamber 620 up to the gap 630, which results in insufficient amount of lubricant in the chamber 620 for attaining sufficient centrifugal oil pressure.

A lubricant is thus always supplied to the balance oil chamber 620 through the lubricant-oil pressure line 210 for shifting the drive range to the OD side.

On the other hand, while the drive range is shifted from the OD to LOW side by the operation of the primary pulley 550 at a predetermined high vehicle speed or more, a lubricant in the oil cylinder 560 of the primary pulley 550 is drained to increase the volume of the balance oil chamber 580 of the secondary pulley 571 to decrease the volume of the balance oil chamber, thus no need to supply a lubricant to the chamber 620 from the lubricant-pressure line 210 with no primary pressure Pp.

This results in decrease in supply of oil from the primary valve 400 to the primary-pressure line 190 while an amount of oil drained to the drain line 180 is increased to apply a predetermined oil pressure to the balance chamber-control valve 200.

The pressure of the drained oil is increased by the orifice 180*a* provided in midstream of the drain line 180 and maintained at the predetermined oil pressure by the check valve 180*b*.

The predetermined oil pressure applied from the drain line 180 to the balance chamber-control valve 200 presses the spool 200*a* of the control valve 200 against the spring 200*b* to close the lubricant-pressure line 210 to stop the oil supply to the balance oil chamber 620.

As disclosed, according to the CVT-oil pressure control apparatus of the present invention, when the drive range is shifted from the OD to LOW side at a predetermined high vehicle speed or more, a lubricant supplied to the balance oil chamber 620 of the secondary pulley 571 through the lubricant-pressure line 210 is stopped to decrease an amount of lubricant supplied to the line 210, that decreases the amount of oil discharged by the oil pump 200, thus decreasing a mechanical loss of the oil pump 200 for improvement in fuel consumption.

Moreover, the present invention achieves decrease in oil amount drained from the balance oil chamber 620 of the secondary pulley 571 to decrease the amount of lubricant agitated by the rotation of the secondary pulley 571, thus decreasing in agitation resistance which would otherwise be generated due to a lot of oil to the pulleys, and restricting increase in oil temperature.

Figure 16:
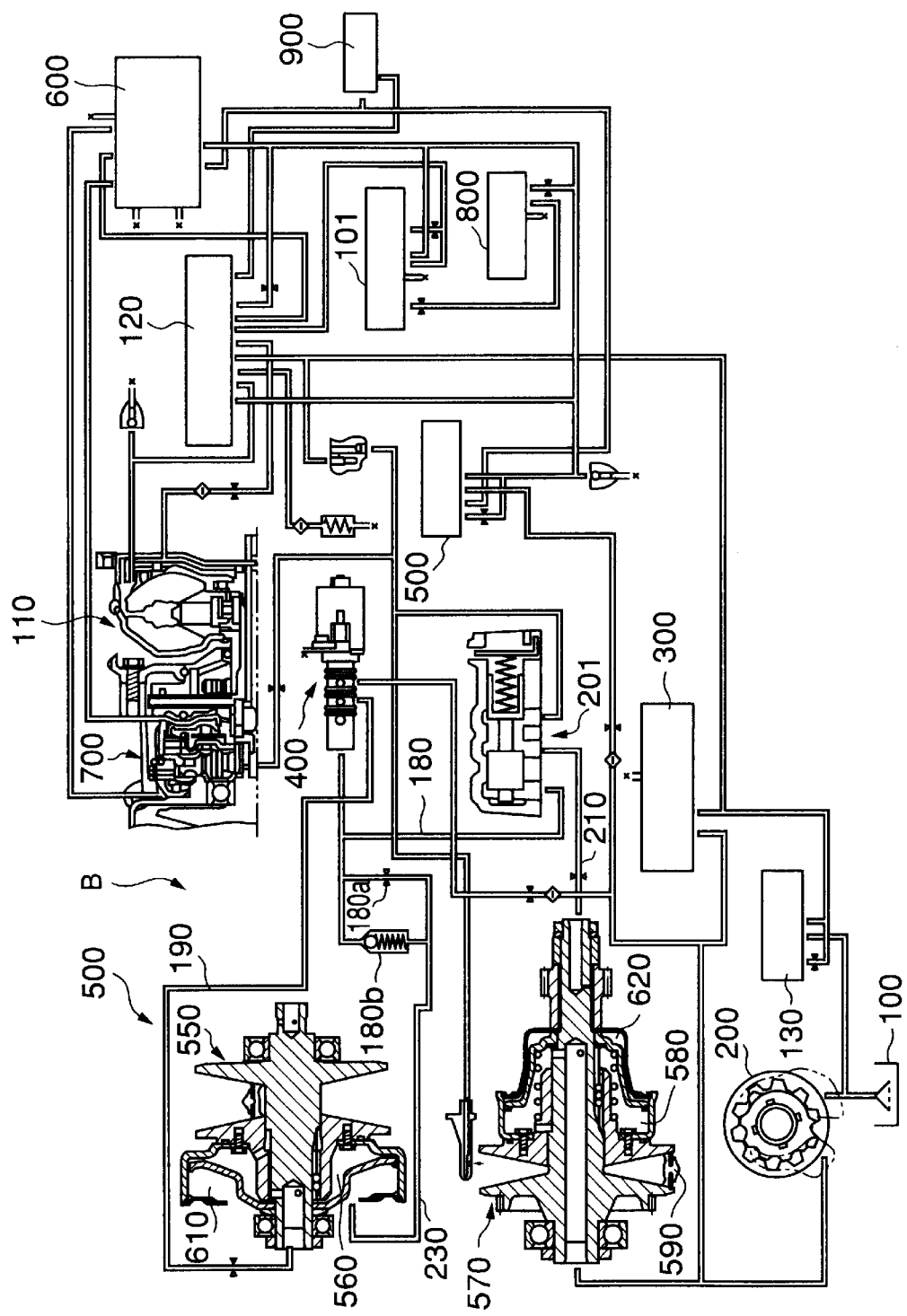
FIG. 16 is a circuit diagram of the ninth preferred embodiment of a CVT oil-pressure control apparatus according to the present invention.
Figure 17:
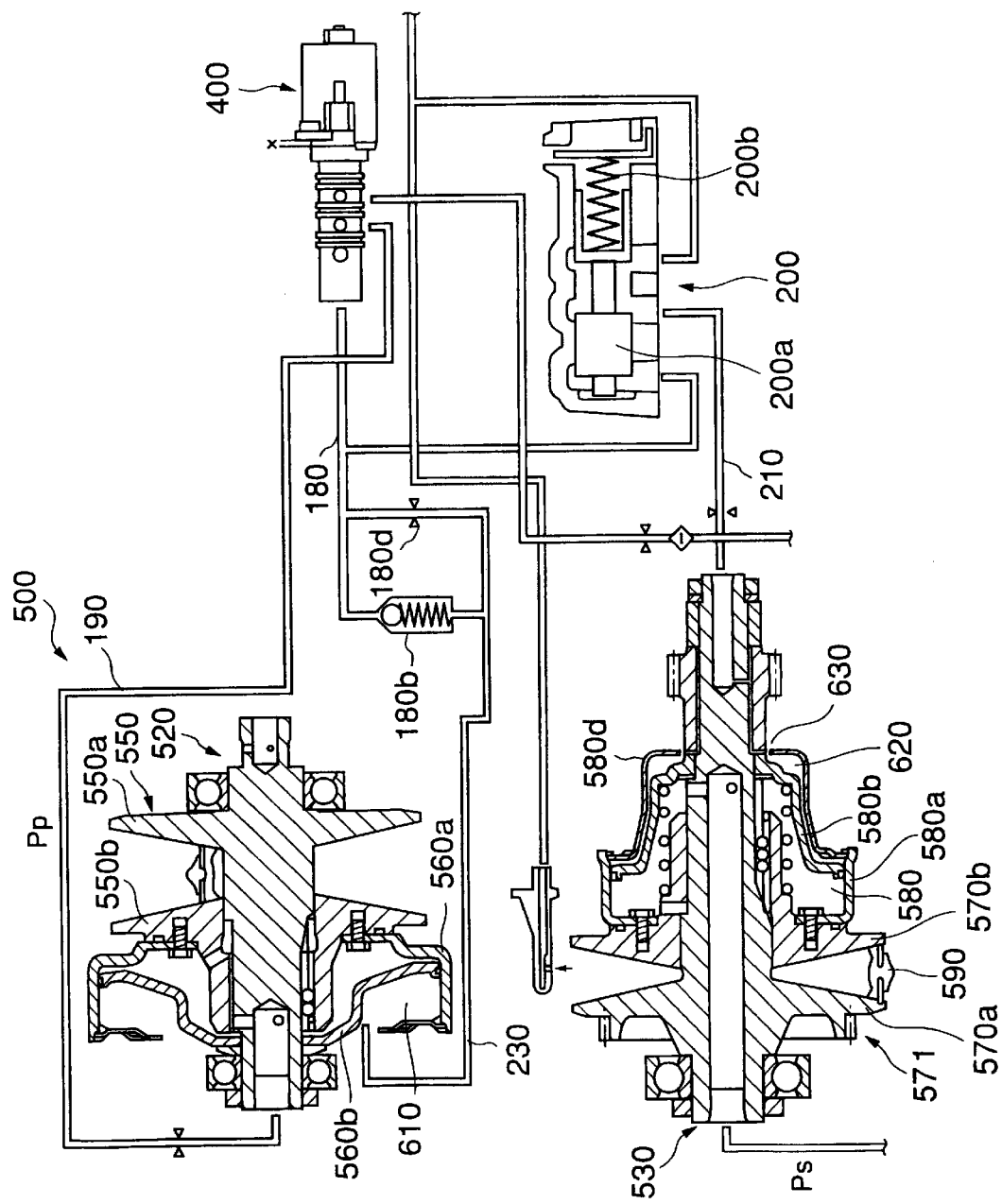
FIG. 17 is an enlarged view of the region "B" shown in FIG. 16.

FIG. 16 is a circuit diagram of the ninth preferred embodiment of a CVT oil-pressure control apparatus according to the present invention. FIG. 17 is an enlarged view of the region "B" shown in FIG. 16.

Elements in this embodiment that are the same as or analogous to elements shown in FIGS. 13 to 15 are referenced by the same reference numbers and will not be explained in detail.

In FIG. 16, the drain line 180 for applying a control oil pressure from the primary valve 400 to the balance oil-control valve 201 is divided into a line for maintaining the control oil pressure to the valve 201 and also another line, or a lubricant-pressure line 230 connected to the valance oil chamber 610 of the primary pulley 550 via the orifice 180*a* and the check valve 180*b* for maintaining a predetermined oil pressure.

When the drive range is shifted from the OD to LOW side by the operation of the primary pulley 550, the volume of the oil-pressure cylinder 560 of the primary pulley 550 is decreased to increase the volume of the balance oil chamber 610.

The oil at the line pressure Ps that corresponds to decrease in volume of the oil-pressure cylinder 560 is supplied to the drain line 180, according to the characteristics of the primary valve 400, and supplied from the drain line 180 to the balance chamber control valve 200. The oil is also supplied from the drain line 180 to the balance oil chamber 610 for canceling the centrifugal oil pressure to the oil cylinder 560 through the lubricant-pressure line 230 via the orifice 180*a* and the check valve 180*b*.

On the other hand, when the drive range is not changed or changed from the LOW to OD side according to the rotation of the primary pulley 550, the volume of the balance oil chamber 610 does not vary or is decreased, thus requiring no supply of lubricant.

The amount of oil supplied to the drain line 180 is decreased according to the characteristics of the primary valve 400, which is supplied from the drain line 180 to the balance chamber control valve 200 as a control pressure. A part of the oil is supplied from the drain line 180 to the valance oil chamber 610 through the lubricant-pressure line 230 via the orifice 180*a* and the check valve 180*b*.

As disclosed above, according to this embodiment, in addition to the structure in the eighth embodiment, a lubricant, that is always supplied to the valance oil chamber 610 of the primary pulley 550 at the line-pressure Ps in the well-known apparatus, is supplied thereto only when the drive range is shifted from the OD to LOW side.

This structure decreases the amount of oil discharged by the oil pump 200, thus decreasing a mechanical loss of the oil pump 200 for improvement in fuel consumption.

Figure 18:
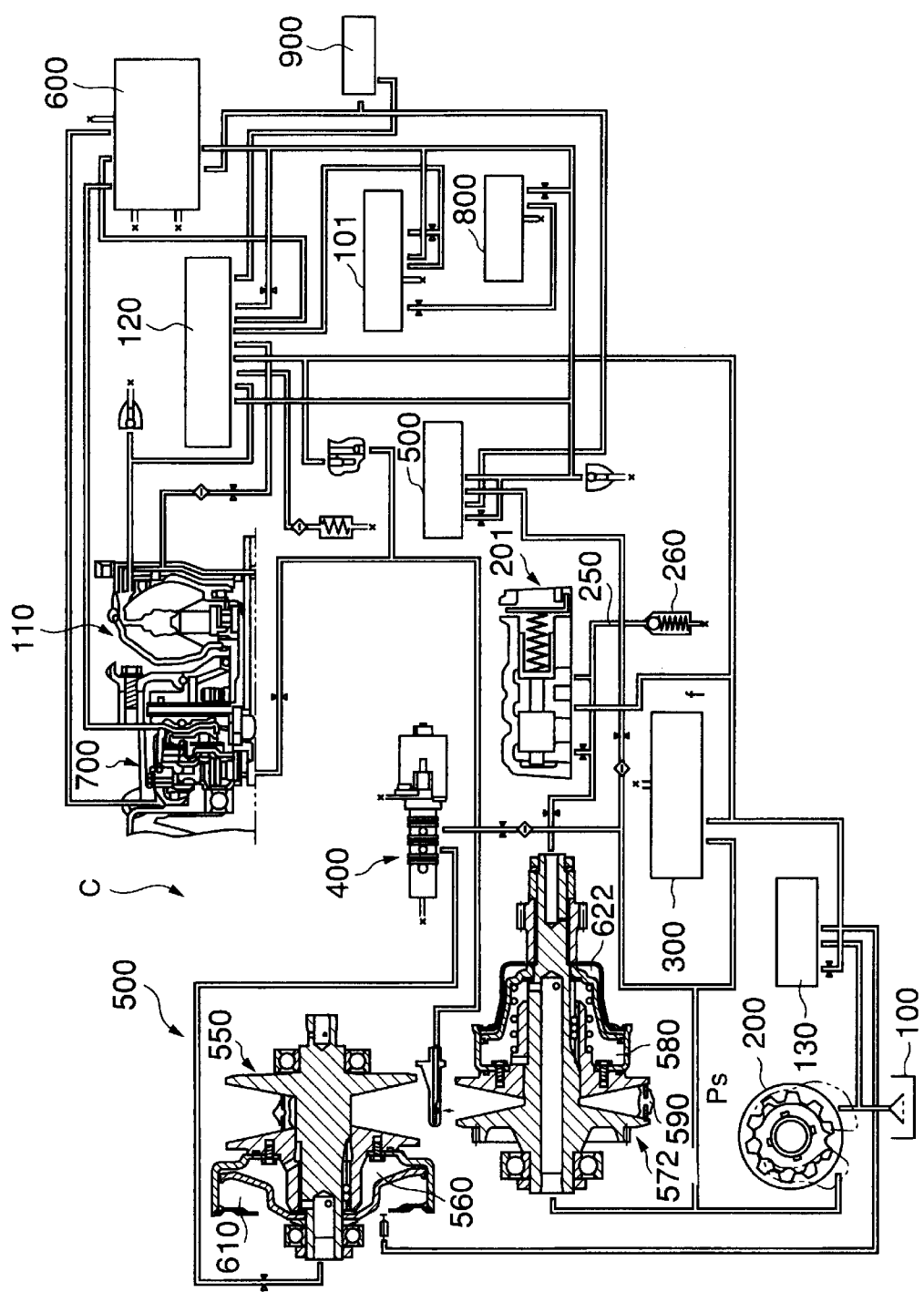
FIG. 18 is a circuit diagram of the tenth preferred embodiment of a CVT oil-pressure control apparatus according to the present invention.
Figure 19:
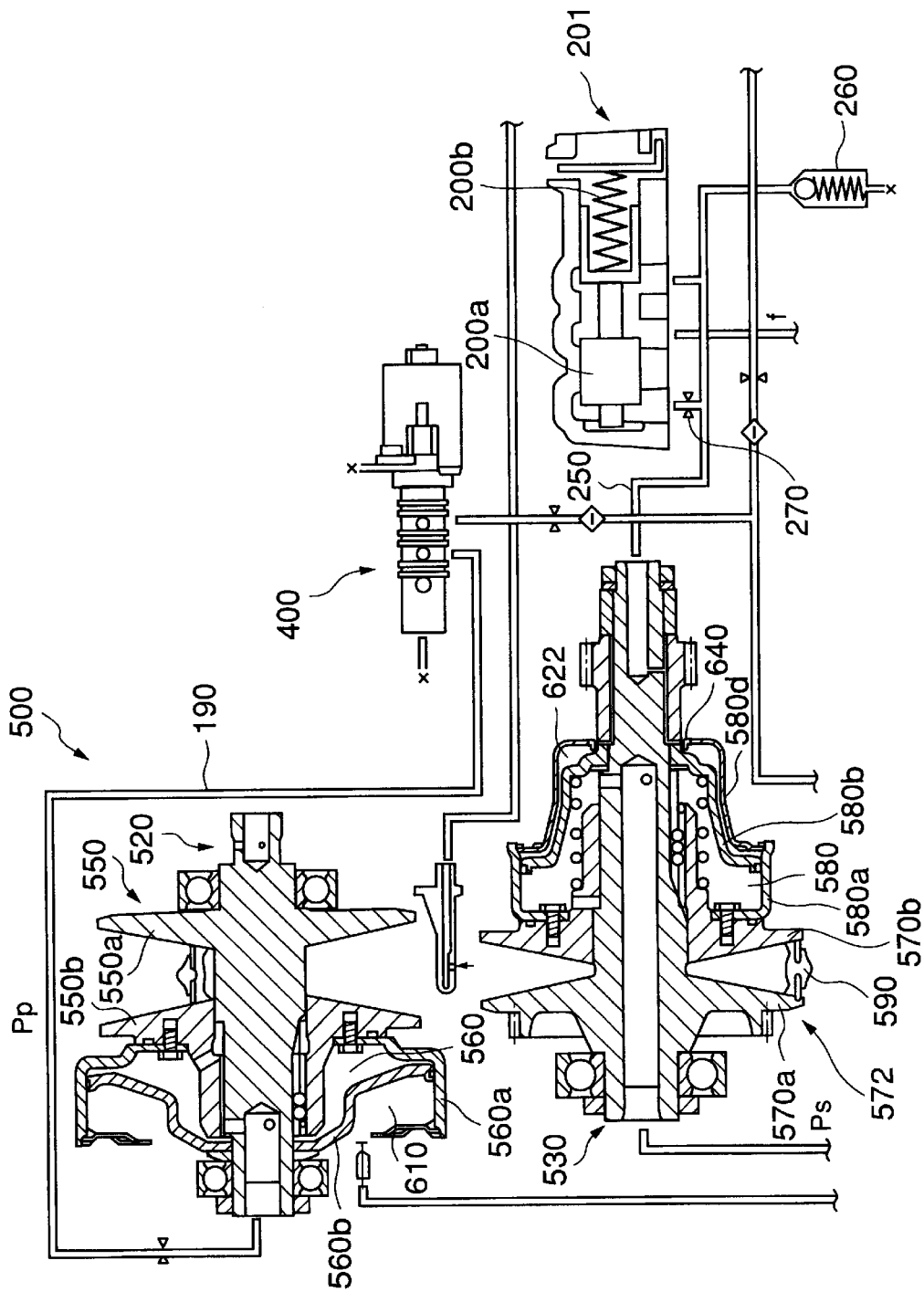
FIG. 19 is an enlarged view of the region "C" shown in FIG. 18.

FIG. 18 is a circuit diagram of the tenth preferred embodiment of a CVT oil-pressure control apparatus according to the present invention. FIG. 19 is an enlarged view of the region C shown in FIG. 18.

Elements in this embodiment that are the same as or analogous to elements shown in FIGS. 13 to 15 are referenced by the same reference numbers and will not be explained in detail.

In FIG. 19. a secondary pulley 572 is provided with a balance oil chamber 622 that has a seal 640 at an end of the balance oil chamber 580*d*. The seal 640 is brought into intimate contact with the shaft of the fixed pulley 570*a*.

A lubricant is supplied to the balance oil chamber 622 through the lubricant-pressure line 250 under the control of the balance oil-pressure control valve 201 based on a lubricant pressure "f" adjusted by the lubrication valve 130.

The lubricant-pressure line 250 is connected to the balance oil chamber 622 through the line in the shaft of the fixed pulley 560*a*, provided with a check valve 260 for draining the lubricant in the line 250 at a predetermined oil pressure.

The oil pressure in the lubricant-pressure line 250 is used as a control oil pressure to the balance oil-pressure control valve 201 via an orifice 270.

A drain pressure on the check valve 260 is set as slightly higher than the control pressure of the balance oil control valve 201.

A line pressure on the lubricant-pressure line 250 is adjusted at a constant pressure by the balance oil-control valve 201. This pressure on the line 250, or the oil pressure in the balance oil chamber 622 is used to lower a clamping power of the drive belt 590 of the secondary pulley 572. The oil pressure can be attained by filling the balance oil chamber 622 with a lubricant through the lubricant-pressure line 250 on which a low oil pressure is set, for example, 0.1 MPA or less, with no affection to the belt clamping power.

An amount of lubricant required for the balance oil chamber 622 of the secondary pulley 572 is discussed.

While the secondary pulley 572 is not rotating, or the drive range is not changing, a lubricant is supplied to balance oil chamber 622 through the lubricant-pressure line 250 via the balance oil control valve 201. The chamber 622 is filled with the lubricant by maintaining the pressure in the chamber due to no change in cylinder volume of the chamber.

While the drive range is shifted from the LOW to OD side by the operation of the secondary pulley 572, a lubricant in the oil cylinder 580 of the secondary pulley 572 is drained to decrease its volume to increase the volume of the balance oil chamber 622, thus decreasing the oil pressure in the chamber 622.

To maintain the oil pressure in the balance oil chamber 622, the lubricant pressure "f" adjusted by the lubrication valve 130 is applied to the balance oil chamber 622 through the lubricant-pressure line 250 via the balance oil-pressure control valve 201 to fill the chamber 622 with the lubricant to cancel the centrifugal oil pressure in the oil-pressure cylinder 580.

On the other hand, while the drive range is shifted from the OD to LOW side by the operation of the secondary pulley 572, a lubricant is supplied to the oil cylinder 580 of the secondary pulley 572 to increase its volume to decrease the volume of the balance oil chamber 622.

Therefore, the lubricant-pressure line 250 including the balance oil chamber 622 is closed, and the lubricant-pressure "f" is reduced by the balance oil-control valve 201 and supplied to the lubricant-pressure line 250.

When the pressure in the lubricant-pressure line 250 becomes a predetermined pressure or more, the orifice 270 applies a control pressure to the balance oil-control valve 201. The control pressure presses the spool 200*a* against the spring 200*b* to stop supply of lubricant to the lubricant-pressure line 250 while a lubricant corresponding to a decreased volume of the control valve 201.

A drain pressure in the check valve 260 set at a pressure slightly higher than the control pressure of the balance oil-pressure control valve 201 while the drive range is not shifted or shifted from the LOW to OD range according to the rotation of the secondary pulley 572, offers decrease in an amount of lubricant flow to be required because it is not drained from the check valve 260.

The drain pressure set as above also restricts decrease in belt clumping power while the drive range is shifted from the OD to LOW side because an increase in oil pressure in the balance oil chamber 622 is restricted.

According to this embodiment, in addition to the structure in the eighth embodiment, the balance oil chamber 622 in a sealed structure offers an extremely low control pressure for the balance oil chamber 622 and the lubricant-pressure line 250 to restrict increase in line pressure Ps, thus achieving decrease in mechanical loss of the oil pump 200, etc.

It is further understood by those skilled in the art that the foregoing description are preferred embodiments of the disclosed device and that various change and modification may be made in the invention without departing from the spirit and scope thereof.

For example, the present invention is applicable to any CVT with no torque converter, such as, the converter 2 shown in FIG. 2.

As disclosed above, according to the present invention, oil drained from the primary valve is supplied to the balance oil chamber of the primary pulley, thus reducing oil consumption on the lubricant-pressure line.

The supply of oil from the primary valve to the balance oil chamber is performed when the primary pulley starts to rotate and also while it is rotating for changing the drive range.

Since consumption of oil on the lubricant-pressure line is decreased, an amount of oil discharged from the oil pump to the lubricant-pressure line is reduced. The present invention therefore decreases mechanical loss of the oil pump to improve fuel consumption.

Moreover, according to the present invention, oil discharged by the oil pump is supplied to the balance oil chambers of the primary and the secondary pulleys via the oil cooler, thus reducing the amount of oil to be supplied to the lubricant-pressure line.

Shortage of oil supplied to the balance oil chambers that happens when the primary pulley starts to rotate or when the volumes of the chambers vary while the primary pulley is rotating can be compensated for through the cooling line with no special supply line.

Supply of lubricant to the forward/backward-switching mechanism can also be performed through the cooling line without through the lubricant-pressure line from the oil pump.

This structure also decreases consumption of oil on the lubricant-pressure line to reduce an amount of oil discharged from the oil pump for decreasing mechanical loss of the oil pump to improve fuel consumption.

Furthermore, according to the present invention, a lubricant is supplied to the balance oil chamber for canceling centrifugal oil pressure generated by the oil cylinder of the secondary pulley when the lubricant in the chamber is leaked out or its amount is insufficient; and supply of lubricant to the chamber is stopped while the lubricant in the chamber is being drained during shift-down, thus reducing amount of oil from the oil pump.

The present invention therefore achieves a compact oil pump with reduced mechanical loss, thus improving fuel consumption.

Moreover, the present invention achieves easy control of the balance oil-pressure control valve by closing the valve using a drain oil pressure from the primary valve, which is increased during shift-down.

Furthermore, a drain oil pressure generated by the primary valve is applied to the balance oil chamber of the primary valve for supplying lubricant during shift-down.

Accordingly, the present invention achieves supply of lubricant mainly only at shift-down, which is always supplied to the balance oil chamber for the well-known apparatus, thus reducing the amount of oil by the oil pump for compactness.

Moreover, the present invention employs a sealed-structure of the balance oil chamber for canceling centrifugal oil pressure generated by the oil cylinder of the secondary pulley. This sealed structure offers an extremely low control pressure to the balance oil chamber and the lubricant-pressure line.

Supply of lubricant from the balance oil-control valve to the balance oil chamber is stopped while the lubricant is drained from the lubricant-pressure line when the line pressure is a predetermined value or more.

The present invention therefore achieves supply of lubricant by maintaining oil in the balance oil chamber, and further decrease in required amount of lubricant with no lubricant draining while the secondary pulley is not rotating or rotating for shift-up.

What is claimed is:

1. An oil-pressure control apparatus for a Continuously variable transmission having a primary pulley and a secondary pulley, a belt being passed around the primary and the secondary pulleys, the apparatus comprising:

a primary cylinder provided for the primary pulley, having an oil chamber for applying an oil pressure to the primary pulley and a balance oil chamber for applying a centrifugal oil pressure to the primary pulley in a direction which is reverse of a centrifugal oil pressure generated in the oil chamber;

a primary valve for adjusting a primary pressure to be applied to the oil chamber based on a line pressure applied by an oil pump; and a balance oil line that connects a drain port of the primary valve and the balance oil chamber, oil being supplied from the primary valve to the balance oil chamber through the balance oil line.

2. The oil-pressure control apparatus according to claim 1 further comprising:

a secondary valve for adjusting the line pressure;

a lubricant-pressure valve for adjusting a lubricant pressure based on a drain pressure applied by the secondary valve; and a balance lubricant-pressure line that guides the lubricant pressure adjusted by the lubricant-pressure valve to the balance oil chamber.

3. The oil-pressure control apparatus according to claim 2 further comprising:

a feed-back line connected to the lubricant-pressure line; and a check valve provided in midstream of the feed-back line for blocking flow of oil to the balance oil chamber while allowing a reverse flow, the oil being returned to the lubricant-pressure line through the feed-back line via the check valve when an amount of oil supplied to the balance oil chamber from the primary valve is larger than a predetermined amount.

4. An oil-pressure control apparatus for a Continuously variable transmission having a primary pulley and a secondary pulley, a belt being passed around the primary and the secondary pulleys, the apparatus comprising:

a primary cylinder provided for the primary pulley, having an oil chamber for applying an oil pressure to the primary pulley and a balance oil chamber for applying a centrifugal oil pressure to the primary pulley in a direction which is reverse of a centrifugal oil pressure generated in the oil chamber;

a primary valve for adjusting a primary pressure to be applied to the oil chamber based on a line pressure applied by an oil pump;

a balance oil line that connects a drain port of the primary valve and the balance oil chamber, oil being supplied from the primary valve to the balance oil chamber through the balance oil line;

a secondary valve for adjusting the line pressure;

a lubricant-pressure valve for adjusting a lubricant pressure based on a drain pressure applied by the secondary valve;

a balance lubricant-pressure line that guides the lubricant pressure adjusted by the lubricant-pressure valve to the balance oil chamber;

a feed-back line connected to the lubricant-pressure line;

a check valve provided in midstream of the feed-back line for blocking flow of oil to the balance oil chamber while allowing a reverse flow, the oil being returned to the lubricant-pressure line through the feed-back line via the check valve when an amount of oil supplied to the balance oil chamber from the primary valve is larger than a predetermined amount; and an orifice provided in midstream of the lubricant-pressure line as parallel to the check valve provided in midstream of the feed-back line.

5. An oil-pressure control apparatus for a Continuously variable transmission having a primary pulley and a secondary pulley, a belt being passed around the primary and the secondary pulleys, the apparatus comprising:

a primary cylinder provided for the primary pulley, having an oil chamber for applying an oil pressure to the primary pulley and a balance oil chamber for applying a centrifugal oil pressure to the primary pulley in a direction which is reverse of a centrifugal oil pressure generated in the oil chamber;

a primary valve for adjusting a primary pressure to be applied to the oil chamber based on a line pressure applied by an oil pump;

a balance oil line that connects a drain port of the primary valve and the balance oil chamber, oil being supplied from the primary valve to the balance oil chamber through the balance oil line; and wherein the primary valve includes:
 a valve housing having a spool; and
 a solenoid attached to the valve housing, for adjusting a pilot pressure in a pilot chamber of the primary valve, a drain oil drained from the pilot chamber being supplied to the balance oil chamber.

6. An oil-pressure control apparatus for a Continuously variable transmission having a primary pulley and a secondary pulley, a belt being passed around the primary and the secondary pulleys, the apparatus comprising:

a primary cylinder provided for the primary pulley, having an oil chamber for applying an oil pressure to the primary pulley and a balance oil chamber for applying a centrifugal oil pressure to the primary pulley in a direction which is reverse of a centrifugal oil pressure generated in the oil chamber;

a primary valve for adjusting a primary pressure to be applied to the oil chamber based on a line pressure applied by an oil pump;

a balance oil line that connects a drain port of the primary valve and the balance oil chamber, oil being supplied from the primary valve to the balance oil chamber through the balance oil line; and wherein the primary valve is a spool valve having an external pilot chamber and a magnetic valve for applying an external pilot pressure to the external pilot chamber based on a clutch pressure, oil drained from the magnetic valve being supplied to the balance oil chamber.

7. An oil-pressure control apparatus for a continuously variable transmission having a primary pulley and a secondary pulley, a belt being passed around the primary and the secondary pulleys, the apparatus comprising:

a primary cylinder provided for the primary pulley, having a primary chamber for applying an oil pressure to the primary pulley and a primary balance oil chamber for applying a centrifugal oil pressure to the primary pulley in a direction which is reverse of a centrifugal oil pressure generated in the primary chamber;

a secondary cylinder provided for the secondary pulley, having a secondary chamber for applying an oil pressure to the secondary pulley and a secondary balance oil chamber for applying a centrifugal oil pressure to the secondary pulley in a direction which is reverse of a centrifugal oil pressure generated in the secondary oil chamber;

a balance oil line that connects a cooling line and the balance oil chamber, an oil cooler being provided in midstream of the cooling line, oil passing through the oil cooler being supplied to the primary and the secondary balance chambers through the balance oil line.

8. The oil-pressure control apparatus according to claim 7 further comprising a lubricant-supply line, the oil passing through the oil cooler being supplied to a forward/backward-switching mechanism for lubrication through the lubricant-supply line.

9. An oil-pressure control apparatus for a continuously variable transmission having a primary pulley and a secondary pulley, a belt being passed around the primary and the secondary pulleys, the apparatus comprising:

a fixed pulley fixed at a secondary shaft of the secondary pulley;

a slidable pulley attached to a shaft of the fixed pulley, the slidable pulley being slidable in direction of the shaft of the fixed pulley and rotating with the fixed pulley in a uniform motion with respect to each other;

a transmission oil-pressure cylinder having a cylinder fixed at the back of the slidable pulley and a plunger fixed at the shaft of the fixed pulley;

a balance oil chamber formed by the cylinder, the plunger and a balance oil chamber cylinder, one end of the balance oil chamber cylinder being connected to the cylinder, the other end of the balance oil chamber cylinder being slidably connected to the shaft of the fixed pulley via a gap, the balance oil chamber canceling a centrifugal oil pressure generated due to rotation of the pulleys; and a balance oil-pressure control valve for supplying a lubricant to the balance oil chamber, the balance oil-pressure control valve being closed while the lubricant supplied to the balance oil chamber is being drained therefrom.

10. The oil-pressure control apparatus according to claim 9 further comprising a primary valve for controlling a primary pressure to be applied to an oil cylinder of the primary pulley, the balance oil-pressure control valve being closed by a drain pressure from the primary valve during shift-down.

11. The oil-pressure control apparatus according to claim 10 further comprising:

a primary fixed pulley fixed at a primary shaft of the primary pulley;

a primary slidable pulley attached to a shaft of the primary fixed pulley, the primary slidable pulley being slidable in a direction of the shaft of the primary fixed pulley and rotating with the primary fixed pulley in a uniform motion with respect to each other;

a primary transmission oil-pressure cylinder having a primary cylinder fixed at the back of the primary slidable pulley and a primary plunger fixed at the shaft of the primary fixed pulley;

a primary balance oil chamber formed by primary cylinder, the primary plunder and a primary balance oil chamber cylinder, one end of the primary balance oil chamber cylinder being connected to the primary cylinder, the primary balance oil chamber canceling a centrifugal oil pressure generated due to rotation of the pulleys; and a lubricant-pressure line for guiding a drain oil pressure from the primary valve to the primary balance oil chamber during shift-down.

12. An oil-pressure control apparatus for a continuously variable transmission having a primary pulley and a secondary pulley, a belt being passed around the primary and the secondary pulleys, the apparatus comprising:

- a fixed pulley fixed at a secondary shaft of the secondary pulley;
- a slidable pulley attached to a shaft of the fixed pulley, the slidable pulley being slidable in a direction of the shaft of the fixed pulley and rotating with the fixed pulley in a uniform motion with respect to each other;
- a transmission oil-pressure cylinder having a cylinder fixed at the back of the slidable pulley and a plunger fixed at the shaft of the fixed pulley;
- a balance oil chamber formed by the cylinder, the plunger and a balance oil chamber cylinder, one end of the balance oil chamber cylinder being connected to the cylinder, an other end of the balance oil chamber cylinder being slidably connected to the shaft of the fixed pulley via a seal,
- the balance oil chamber canceling a centrifugal oil pressure generated due to rotation of the pulleys; and a balance oil-pressure control valve for supplying a lubricant to the balance oil chamber through a lubricant-pressure line, the lubricant being drained from the lubricant-pressure line and the balance oil-pressure control valve being closed to stop supply of the lubricant to the balance oil chamber when an oil pressure on the lubricant-pressure line is a predetermined pressure or higher.

* * * * *